(12) United States Patent
Morris et al.

(10) Patent No.: US 12,459,328 B2
(45) Date of Patent: Nov. 4, 2025

(54) SUPPLEMENTAL AERODYNAMIC HEAT EXCHANGER FOR A VEHICLE

(71) Applicant: APTERA MOTORS CORP., San Diego, CA (US)

(72) Inventors: Daniel Morris, San Marcos, CA (US); Steve Fambro, San Diego, CA (US); Eric Byers, Oceanside, CA (US); Chris Anthony, San Diego, CA (US); Jason Hill, Costa Mesa, CA (US); John Klopp, III, Encinitas, CA (US)

(73) Assignee: APTERA MOTORS CORP., San Diego, CA (US)

( * ) Notice: Subject to any disclaimer, the term of this patent is extended or adjusted under 35 U.S.C. 154(b) by 0 days.

(21) Appl. No.: 17/931,239

(22) Filed: Sep. 12, 2022

(65) Prior Publication Data
US 2024/0100905 A1   Mar. 28, 2024

(51) Int. Cl.
*B60H 1/00*   (2006.01)
*F28D 21/00*   (2006.01)

(52) U.S. Cl.
CPC ..... *B60H 1/00042* (2013.01); *B60H 1/00207* (2013.01); *B60H 2001/00092* (2013.01);
(Continued)

(58) Field of Classification Search
CPC ..... F28D 2021/0092; F28D 2021/0096; B60H 1/00295; B60H 1/00321; B60H 1/00207;
(Continued)

(56) References Cited

U.S. PATENT DOCUMENTS

| | | | |
|---|---|---|---|
| 4,460,055 A * | 7/1984 | Steiner | B62D 35/00 296/180.1 |
| 4,989,499 A * | 2/1991 | Scoccia | B60H 1/00821 454/70 |

(Continued)

FOREIGN PATENT DOCUMENTS

| | | | |
|---|---|---|---|
| AT | 404709 B | * | 12/1998 |
| CN | 206218036 U | | 6/2017 |

(Continued)

OTHER PUBLICATIONS

FR-2865436-A1 English machine translation (Year: 2005).*
(Continued)

*Primary Examiner* — Jenna M Maroney
(74) *Attorney, Agent, or Firm* — Wasserbauer Law, LLC; Nicholas E. Blanton, Esq.; Damian G. Wasserbauer, Esq.

(57) ABSTRACT

An electric vehicle having a heat exchanger formed in an aerodynamic airfoil shape comprising one or more body panels disposed along an outer surface of the vehicle having one or more fluidic chambers or micro-channels. The heat exchanger is adapted to provide effective and highly efficient heat transfer, and also to provide substantially reduced or negligible contribution to the aerodynamic drag. The heat exchanger includes a supplemental heat exchange system wherein at least a portion of the heat exchange capacity is provided by an inner heat exchange surface of the heat exchanger exposed to an interstitial space within the vehicle. Airflow is forced, via a fan for example, from an aerodynamically-efficient inlet, over the inner heat exchange surface, and exhausted through an aerodynamically-efficient outlet, thereby providing a supplemental heat exchange system including substantially reduced or negligible contribution to the aerodynamic drag.

18 Claims, 16 Drawing Sheets

(52) U.S. Cl.
CPC .............. *B60H 2001/00107* (2013.01); *B60H 2001/00221* (2013.01); *F28D 2021/0092* (2013.01); *F28D 2021/0096* (2013.01)

(58) Field of Classification Search
CPC ...... B60H 1/00042; B60H 2001/00085; B60H 2001/00221; B60H 2001/00235; B60H 2001/003; B60H 2001/00107; B64D 13/08; F28F 2215/10
See application file for complete search history.

(56) References Cited

U.S. PATENT DOCUMENTS

| | | | | |
|---|---|---|---|---|
| 6,186,886 | B1 * | 2/2001 | Farrington | B60H 1/248 454/75 |
| 7,096,986 | B2 * | 8/2006 | Borroni-Bird | B60H 1/004 180/68.1 |
| 9,802,492 | B2 | 10/2017 | Sikroria et al. | |
| 10,173,518 | B2 | 1/2019 | Chen et al. | |
| 11,007,900 | B2 | 5/2021 | Samyn et al. | |
| 11,039,550 | B1 * | 6/2021 | Zuo | H05K 7/20154 |
| 11,040,612 | B2 | 6/2021 | Suzuki et al. | |
| 11,752,830 | B1 * | 9/2023 | Morris | B60H 1/00278 165/44 |
| 11,975,591 | B2 * | 5/2024 | Morris | B60H 1/00278 |
| 2007/0074850 | A1 * | 4/2007 | Peschl | H01L 23/367 257/E23.102 |
| 2009/0071178 | A1 | 3/2009 | Major et al. | |
| 2013/0032307 | A1 * | 2/2013 | Line | B60H 1/00328 165/41 |
| 2019/0255908 | A1 * | 8/2019 | Imaizumi | B60H 1/00564 |
| 2021/0221253 | A1 | 7/2021 | Watanabe et al. | |
| 2021/0276398 | A1 | 9/2021 | Kazari et al. | |
| 2022/0297530 | A1 * | 9/2022 | Moradnia | F28F 1/12 |

FOREIGN PATENT DOCUMENTS

| | | | | |
|---|---|---|---|---|
| CN | 106379428 | B | | 1/2019 |
| CN | 110040037 | A | | 7/2019 |
| DE | 19755095 | A1 * | 6/1998 | ......... B60H 1/00328 |
| DE | 19931731 | A1 * | 1/2001 | ............. B60K 11/04 |
| DE | 102015008624 | A1 * | 2/2016 | ............. B60K 11/08 |
| DE | 102016224718 | A1 * | 6/2018 | |
| DE | 102017200624 | A1 * | 7/2018 | |
| EP | 0221623 | A2 * | 5/1987 | |
| EP | 3778272 | A1 * | 2/2021 | ......... B60H 1/00207 |
| FR | 2865436 | A1 * | 7/2005 | ......... B60H 1/00478 |
| WO | WO-2014114611 | A1 * | 7/2014 | ............. B62D 25/08 |
| WO | 2019048848 | A1 | 3/2019 | |
| WO | 2019026908 | A1 | 7/2019 | |
| WO | 2021171213 | A1 | 9/2021 | |
| WO | WO-2024059589 | A1 * | 3/2024 | ......... B60H 1/00042 |

OTHER PUBLICATIONS

DE-102017200624-A1 English Machine Translation (Year: 2018).*
DE-19755095-A1 English Machine Translation (Year: 1998).*
DE-19931731-A1 English Machine Translation (Year: 2001).*

* cited by examiner

SUPPLEMENTAL AERODYNAMIC HEAT EXCHANGER FOR A VEHICLE

TECHNICAL FIELD

The present disclosure relates generally to a heat exchanger apparatus, system, and method, and in particular to an electric or solar-electric vehicle having a heat exchanger formed in an aerodynamic shape for heat rejection using vehicle panels and other structures.

BACKGROUND

Heat exchangers are in widespread use in consumer, commercial, and other devices and are useful in numerous industrial applications heating and/or cooling enclosed spaces such as buildings, space and vehicles. Designs of conventional heat exchangers have expanded to include considerations of energy conservation, conversion, recovery, and successful adaptation to new energy sources. The importance of energy usage of heat exchangers has also increased from new environmental guidelines on the effects of a warming planet such as thermal, air, and water pollution. A conventional heat exchanger fundamentally operates by the thermodynamic principle that heat moves from a hotter to a colder object, whereby the heat exchanger device incorporates structures forming separate hot and cold regions. Heat exchangers are designed to spontaneously move heat, or thermal energy, from the hotter region to the colder region with no external heat or work interactions, which implies that the transfer of heat occurs passively, or automatically.

One application of heat exchangers relates to vehicles. In order to cool various systems of a vehicle, heat exchangers may be configured to provide ventilation and/or air conditioning to the passengers in the cabin, to keep the motor from overheating, and/or to remove excess heat from devices transferred to other objects, such as the surrounding air. Conventional heat exchanger designs provide an adequately sized unit to meet the demands of the vehicle's systems by cooling a desired amount when operating the vehicle in the intended manner and/or environment.

One conventional design employs a front-end radiator, located behind a decorative grille as used by vehicles with internal combustion engines. Conventional radiators operate on the principle of air passing through fins to cool fluids and gasses. Conventional radiators are oriented in oncoming airflow from vehicle movement that increases aerodynamic drag, thereby affecting vehicle performance and inducing increased energy usage, e.g. reduced fuel economy. Consequently, there is a long felt need to reduce aerodynamic drag from conventional fins oriented in oncoming airflow in order to improve performance and fuel economy.

Another conventional design, in the case of electric vehicles, employs a base plate heat exchanger underneath the vehicle, between the wheels and adjacent the battery pack. A base plate heat exchanger of this sort may include a flat base plate or a base plate with openings that scoop air into internal confined passages. These designs require vehicle body openings, scoops, edges, protuberances, i.e. body protrusions, and other vehicle structures that contribute significantly to the vehicle's overall aerodynamic drag. While these designs may be adequately sized in that they provide enough heat rejection capacity to meet the cooling demands of the vehicles systems, they remain aerodynamically inefficient and contribute to the amount of energy or fuel required to propel the vehicle.

Aerodynamic drag, or air resistance, is a force that the oncoming air applies to the vehicle when it is moving. Aerodynamic drag negatively affects the vehicle's speed, fuel economy, and overall performance. While a variety of different techniques and system configurations have been used for vehicle heat exchanger designs, they suffer from aerodynamic inefficiencies in the form of significant contribution to aerodynamic drag, which in turn affects fuel economy and overall vehicle performance. Accordingly, what is needed is an HVAC system having a heat exchanger that achieves effective heat transfer without contributing to the vehicle's aerodynamic drag. The present invention provides a solution to a long felt need for effective heat transfer without contributing to the vehicle's aerodynamic drag by using smooth surfaces and increasing surface area for cooling so as to allow for the transfer of heat outside the vehicle.

SUMMARY

The present invention provides a functionally, economically, and aesthetically advantageous vehicular HVAC system that employs an aerodynamic, lightweight heat exchanger including efficient and effective heat transfer.

An object of the present invention is to provide an aerodynamic heat exchanger that serves as a supplemental heat rejection apparatus, system, and/or method that operates at times when the primary heat rejection mechanism is unable to meet the cooling demands, while exhibiting a negligible, near-zero contribution to the vehicle's drag.

A further object of the present invention is to provide an aerodynamic heat exchanger that relies on a variety of modes of heat transfer, including free convection, radiation, and/or forced convection.

A further object of the present invention is to provide an aerodynamic heat exchanger that eliminates, or substantially eliminates, flow separation occurring over the heat exchanger, thereby decreasing the drag of the heat exchanger when drag factors are considered either in isolation or in the context of the overall vehicle. It is a further object of the present invention to reduce flow separation and drag, whereby vehicle performance may be increased.

A further object of the present invention is to provide an aerodynamic heat exchanger that eliminates, or substantially eliminates, the heat exchanger's contribution to the pressure drag and/or friction drag of the vehicle, whether considered in isolation or in the context of the overall vehicle.

A further object of the present invention is to provide a heat exchanger having heat rejection surfaces on opposing sides. For example, the heat exchanger may have on one side a surface exposed to the ambient environment to reject heat, and on another side a surface exposed to an interior cavity of the vehicle and configured to reject heat therein. An interior surface of this sort may draw air from a first opening and exhaust to a second opening.

A further object of the present invention is to provide a cowl air inlet that provides a negligible, near-zero contribution to vehicle drag.

A further object of the present invention is to provide a trailing end outlet that provides a negligible, near-zero contribution to vehicle drag.

A further object of the present invention is to reduce or eliminate perturbances that 'trip' or otherwise induce turbulence of the airflow over the vehicle, including airflow over the heat exchanger.

A further object of the present invention is to provide an aerodynamic heat exchanger formed integrally with a body panel, thereby reducing weight and increasing vehicle performance.

A further object of the present invention is to provide an aerodynamic heat exchanger that is easily serviceable in that the heat exchanger may include a plurality of fluidly-separate chambers, configured in a series or parallel flow path. The plurality of chambers provides for more readily removing and/or replacing an area of the heat exchanger that experienced localized damaged, thereby leaving the other unaffected chambers in place. It is a further object of the present invention that such chambers may form individual body panels of the vehicle.

A further object of the present invention is to provide an aerodynamic heat exchanger that uses an unpressurized water-glycol mixture, thereby reducing the amount of pressurized refrigerant circulating throughout the vehicle by utilizing one or more fluid circuits in lieu of extensive refrigerant circuits, to reduce the likelihood of pressure loss and/or other damage of the refrigerant loop.

A further object of the present invention is to provide a vehicle heat-exchanger that may be mass-produced at low cost, for example, by providing a plurality of chambers corresponding to body panels that may fit within available commercial fabrication machinery, e.g. commonly-sized production-grade machinery.

Other desirable features and characteristics will become apparent from the subsequent detailed description, the drawings, the abstract, and the claims, when considered in view of this summary.

DESCRIPTION OF THE DRAWINGS

Non-limiting and non-exhaustive embodiments of the present disclosure are described with reference to the following drawings. In the drawings, like numerals describe like components throughout the several views.

For a better understanding of the present disclosure, reference will be made to the following Detailed Description, which is to be read in association with the accompanying drawings, which are incorporated in and constitute a part of this specification, show certain aspects of the subject matter disclosed herein and, together with the description, help explain some of the principles associated with the disclosed implementations, wherein:

FIG. 14 is a schematic view illustrating the flow field formed around a vehicle characterized by numerous flow separations, wherein:

DETAILED DESCRIPTION

Figure 1:
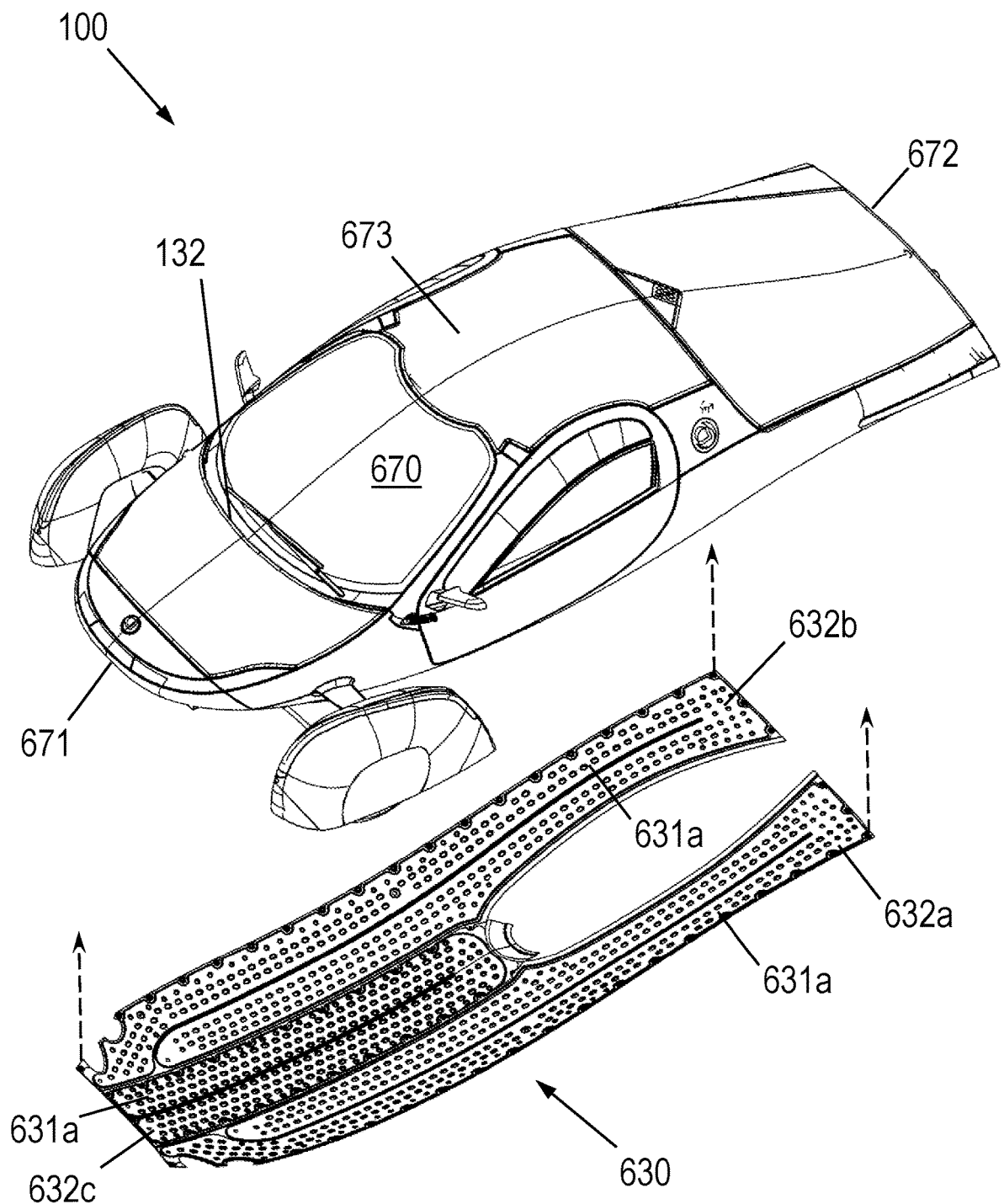
FIG. 1 illustrates a front, top, right-side, exploded, perspective view of an aerodynamic vehicle including an aerodynamic heat exchanger, according to an embodiment of the present invention.

Non-limiting embodiments of the invention will be described below with reference to the accompanying drawings, wherein like reference numerals represent like elements throughout. While the invention has been described in detail with respect to the preferred embodiments thereof, it will be appreciated that upon reading and understanding of the foregoing, certain variations to the preferred embodiments will become apparent, which variations are nonetheless within the spirit and scope of the invention. The drawings featured in the figures are provided for the purposes of illustrating some embodiments of the invention and are not to be considered as limitation thereto.

The terms "a" or "an", as used herein, are defined as one or as more than one. The term "plurality", as used herein, is defined as two or as more than two. The term "another", as used herein, is defined as at least a second or more. The terms "including" and/or "having", as used herein, are defined as comprising (i.e., open language). The term "coupled", as used herein, is defined as connected, although not necessarily directly, and not necessarily mechanically.

Reference throughout this document to "some embodiments", "one embodiment", "certain embodiments", and "an embodiment" or similar terms means that a particular feature, structure, or characteristic described in connection with the embodiment is included in at least one embodiment of the present invention. Thus, the appearances of such phrases or in various places throughout this specification are not necessarily all referring to the same embodiment. Furthermore, the particular features, structures, or characteristics may be combined in any suitable manner in one or more embodiments without limitation.

The term "or" as used herein is to be interpreted as an inclusive or meaning any one or any combination. Therefore, "A, B or C" means any of the following: "A; B; C; A and B; A and C; B and C; A, B and C". An exception to this definition will occur only when a combination of elements, functions, steps or acts are in some way inherently mutually exclusive.

The drawings featured in the figures are provided for the purposes of illustrating some embodiments of the present disclosure, and are not to be considered as a limitation thereto. The term "means" preceding a present participle of an operation indicates a desired function for which there is one or more embodiments, i.e., one or more methods, devices, or apparatuses for achieving the desired function and that one skilled in the art could select from these or their equivalent in view of the disclosure herein and use of the term "means" is not intended to be limiting.

Referring to FIGS. 1-15F, an HVAC system generally designated as reference element 600 is useful for heating, cooling, and ventilating an aerodynamic vehicle 100. FIGS. 1-12B refer to embodiments of the HVAC system 600 having an aerodynamic heat exchanger 630 according to the present invention, FIG. 13 provides an exemplary HVAC system architecture also according to the present invention, and FIGS. 14 to 15A-15F refer to various aerodynamic features and/or parameters of the embodiments disclosed herein.

The HVAC system 600 comprises a user interface 815, an HVAC control system 805, and a plant system 605, wherein HVAC system 600 may be configured to provide the heating, cooling, and ventilating demands of demand systems 650. In particular, HVAC system 600 of aerodynamic vehicle 100 may employ one or more aerodynamic heat exchangers 630. One or more aerodynamic heat exchangers 630 may be formed as one or more body panels disposed along an outer surface of aerodynamic vehicle 100 to provide heat rejection of demand systems 650 via heat transfer communication with various other subsystems of plant system 605. Aerodynamic heat exchanger 630 provides a functionally, economically, and aesthetically advantageous design adapted for: providing effective heat transfer under all operating conditions of vehicle 100, such as sufficient heat rejection capacity to meet the needs of demand system 650; providing highly-efficient, heat transfer through passive convective and radiative heat transfer to the ambient environment over all, or at least most, of the vehicle's operating conditions; providing a supplemental heat exchanger arrangement and/or system that contributes negligible drag to the vehicle during operation and for conditions where the primary heat exchange mode exhibits reduced or otherwise insufficient heat rejection capacity; and providing substantially reduced or negligible contribution to the aerodynamic drag, i.e., a substantially reduced or negligible external drag 661 contributed by the aerodynamic heat exchanger, either in isolation or in combination with other components of vehicle 100. As should be appreciated, aerodynamic heat exchanger 630 comprises one or more fluidic chambers, e.g., 632a-c as in FIG. 1, which are described in the context of one or more body panels disposed along the underside 674, or lower body portion 674, of the vehicle 100, but may alternatively comprise one or more body panels disposed on any surface of the exterior, including hood panel, roof panel, trunk panel, front-side panel, mid-side panel, back-side panel, door panel, front wheel cover, and/or rear-wheel skirt. However, in the preferred embodiment, aerodynamic heat exchanger 630 is disposed along the underside to avoid direct exposure to the sun.

FIGS. 1-12B correspond to a heat exchanger 630 having an aerodynamic shape with specific geometric dimensions and operating parameters according to an embodiment of the present invention. First, design cooling load ranges have been estimated to be from about 1 kW to about 3 kW, e.g., demand systems 650 as in FIG. 13. Cooling capacity is calculated based upon summer high temperature conditions (e.g., 99.5% design condition for hottest operating climate zone) which necessitates, e.g., cabin cooling demand, e.g., passenger sets cabin 800 temperature to 70° F. during a design day in Washington, D.C. of 95° F./78° F., dry bulb temperature/wet bulb temperature. Second, concerning the capacity of the aerodynamic heat exchanger 630 along the exteriorly-exposed surface, 20 kW of heat rejection has been estimated, corresponding to a capacity when the aerodynamic vehicle 100 has reached sufficient speed, above about 10 mph to about 15 mph. Third—and a primary focus of the instant disclosure—a supplemental, heat exchanger apparatus, system, and method is provided, which exchanges up to about 2 kW of heat on the opposite, interior side of aerodynamic heat exchanger 630; one or more additional interiorly-disposed heat exchangers may be employed to provide about 6 kW of total supplemental heat exchange capacity. Under most conditions while the aerodynamic vehicle 100 is in motion, the estimated heat rejection capacity of the aerodynamic heat exchanger 630 exceeds the estimated cooling load: (i) by a safety factor of about 10 over the operable range under consideration for this primary mode of heat rejection, i.e., passive convention and/or radiation from the heat exchanger surface to the ambient; (ii) by a safety factor of about 2 when the supplemental system is employed, i.e., when the vehicle is not in motion or when the vehicle is moving to slowly for the primary mode of heat rejection to operate, whether alone or in combination with the supplemental system.

The aerodynamic heat exchanger 630 advantageously employs an outer heat exchange surface 631b to provide primary, passive heat exchange via ambient airflow and also an inner heat exchange surface 631a to provide supplemental, active, or forced-air, heat exchange. Additionally, although the supplemental system employs active components, such as fans, disposed in an internal cavity, the draw-through function and selection of airflow inlet and outlet ensure that when the supplemental system operates, substantially reduced or negligible external drag 661 is contributed by the aerodynamic heat exchanger, either in isolation or in combination with other components of vehicle 100. Through advantageous selection of the locations of the air inlet and outlet of the supplemental heat exchange system, air may be drawn from and/or exhausted to locations of the vehicle where flow separation exists, e.g., turbulent flow, or the like. As will be elaborated upon further below, that aspect of the present invention thereby takes advantage of a vehicle design that is optimized for aerodynamic performance, while ensuring substantially reduced or negligible external drag 661 is contributed to the heat exchanger, even during operation of the supplement heat exchange.

Over the aforementioned operable range such factors of efficiency of heat transfer have been achieved by the aerodynamic heat exchanger 630, as fans are not needed to push air over the surface of the heat exchanger. This aspect is in contradistinction to conventional front-end heat exchangers, or in certain types of base plate heat exchangers common to electric vehicles, which may require fans to operate over portions of the operating range wherein the instant invention does not. Combining the aerodynamic heat exchanger 630 with the structure of the vehicle provides a reduction in energy on account of the substantially reduced or negligible drag. And the aerodynamic heat exchanger 630 uses comparatively less energy than would otherwise be required, because it takes advantage of passive airflow, or "free" cooling, once the vehicle reaches sufficient speed without the associated aerodynamic penalty. Therefore, the claimed invention has improved heat transfer design aspects relating to heat transfer effectiveness and efficiency as the aforementioned objects of the present invention.

The aerodynamic heat exchanger 630 is characterized in substantially reducing or having negligible contribution to the aerodynamic drag on the aerodynamic vehicle 100, and vehicle aerodynamics more generally. Flow generated by the movement of a road vehicle is extremely complex. The aerodynamic vehicle 100 design optimizes aerodynamic performance by decreasing total air drag 660, thereby increasing fuel economy, vehicle performance, and achieving an aerodynamic vehicle 100 capable of traveling about 1,000 miles on a single charge. To that effect, the body shape of aerodynamic vehicle 100 has a design with significantly improved aerodynamic characteristics over conventional vehicles. For example, aerodynamic vehicle 100 achieves a drag coefficient of $C_d$=0.13, as compared to, e.g., a common four-door sedan, like Opel Vectra (class C), having a reported drag coefficient of $C_d$=0.29, or a Tesla model 3 or model Y, having a reported drag coefficient of $C_d$=0.23. See: https://www.engineeringtoolbox.com/drag-coefficient-d_627.html. Applicant has configured the aerodynamic heat exchanger 630 to provide sufficient performance in isolation for the entire vehicle 100 as well as additional performance from factors due to the cumulative aerodynamic effects of components and features from the entire vehicle 100 and/or its operation.

Referring to FIG. 1-5, an aerodynamic vehicle 100 comprises a body 630 including a leading edge 671, a trailing edge 672, an upper body portion 673, a lower body portion 674, the lower body portion having a maximum thickness 675, and a third wheel assembly 676c disposed proximate the trailing edge 672. The body 670 may include a plurality of body panels including a hood panel, roof panel, trunk panel, front-side panel, mid-side panel, back-side panel, door panel, front wheel cover, and/or rear-wheel skirt. The body 670 may further comprise an aerodynamic heat exchanger 630, which may include first, second, and third chambers 632a, 632b, 632c, respectively. Aerodynamic heat exchanger 630 may form a body panel, such as along the underside 674 shown in FIG. 2. The arrangement shown therein provides a heat rejection surface area of about 3 m$^2$, which conforms to the aerodynamic body 670 shape of the vehicle 100.

In alternative embodiments, aerodynamic heat exchanger 630 may be formed on any exterior portion of body 670, such as one or more of the body panels mentioned. In this context, a body panel refers to an exteriorly-exposed object, i.e., an object exposed to ambient airflow that couples to the structure of the vehicle. Such a body panel may itself form at least part of the structure thereof, or it may couple to a structural frame within body 670.

Although embodiments shown in FIGS. 1-12B include first, second, and third chambers 632a, 632b, 632c, respectively, any number of chambers may be used, and the number, specific sizing, and thermal and/or mechanical coupling of said chambers are non-limiting and considered as being within the scope of this disclosure. For example, two or more discrete chambers may be arrayed in the longitudinal direction, i.e., extending from front end 671 to trailing end 672. Such an arrangement advantageously facilitates manufacturability, serviceability, repair, replacement, and the like of such body panels. As another example, any arrangement of common chambers may be coupled to plant 605 in any known method of one skilled in the art, such as reverse return connections which facilitate uniform return fluid temperature. Furthermore, any fluid may be disposed therein aerodynamic heat exchanger 630, such as, for example, refrigerant, a glycol/water mixture, or water. Aerodynamic heat exchanger 630 may comprise an inner chamber portion 634 coupled to an outer chamber portion 633, which may be fixedly coupled to one another via gasket(s) and one or more fastener assemblies 640, or by any known method. Furthermore, aerodynamic heat exchanger 630 may comprise any material or any combination of materials, for example, aluminum may be used.

Figure 2:
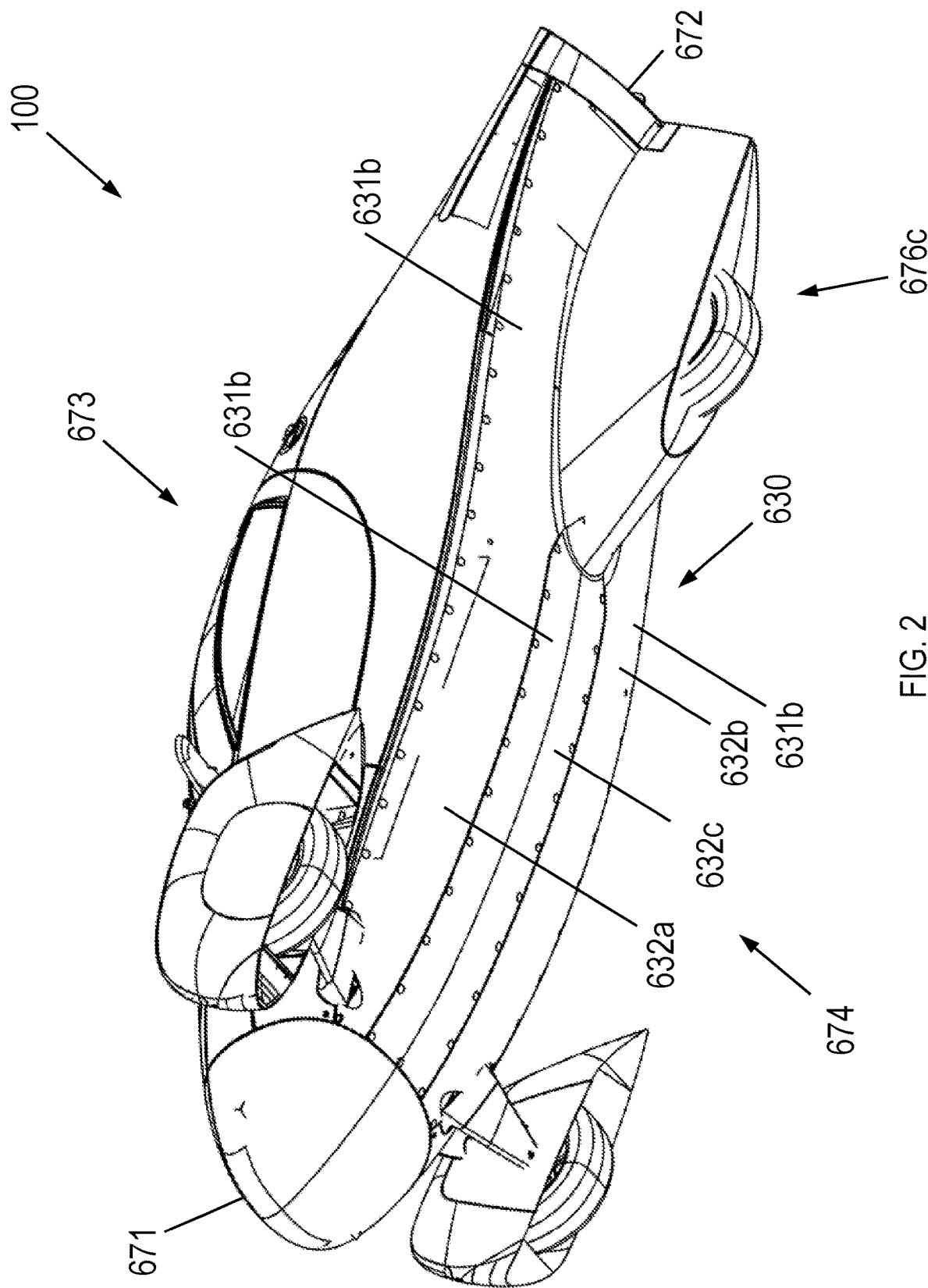
FIG. 2 illustrates a front, bottom, right-side, perspective view of an aerodynamic vehicle including an aerodynamic heat exchanger, according to an embodiment of the present invention.
Figure 3:
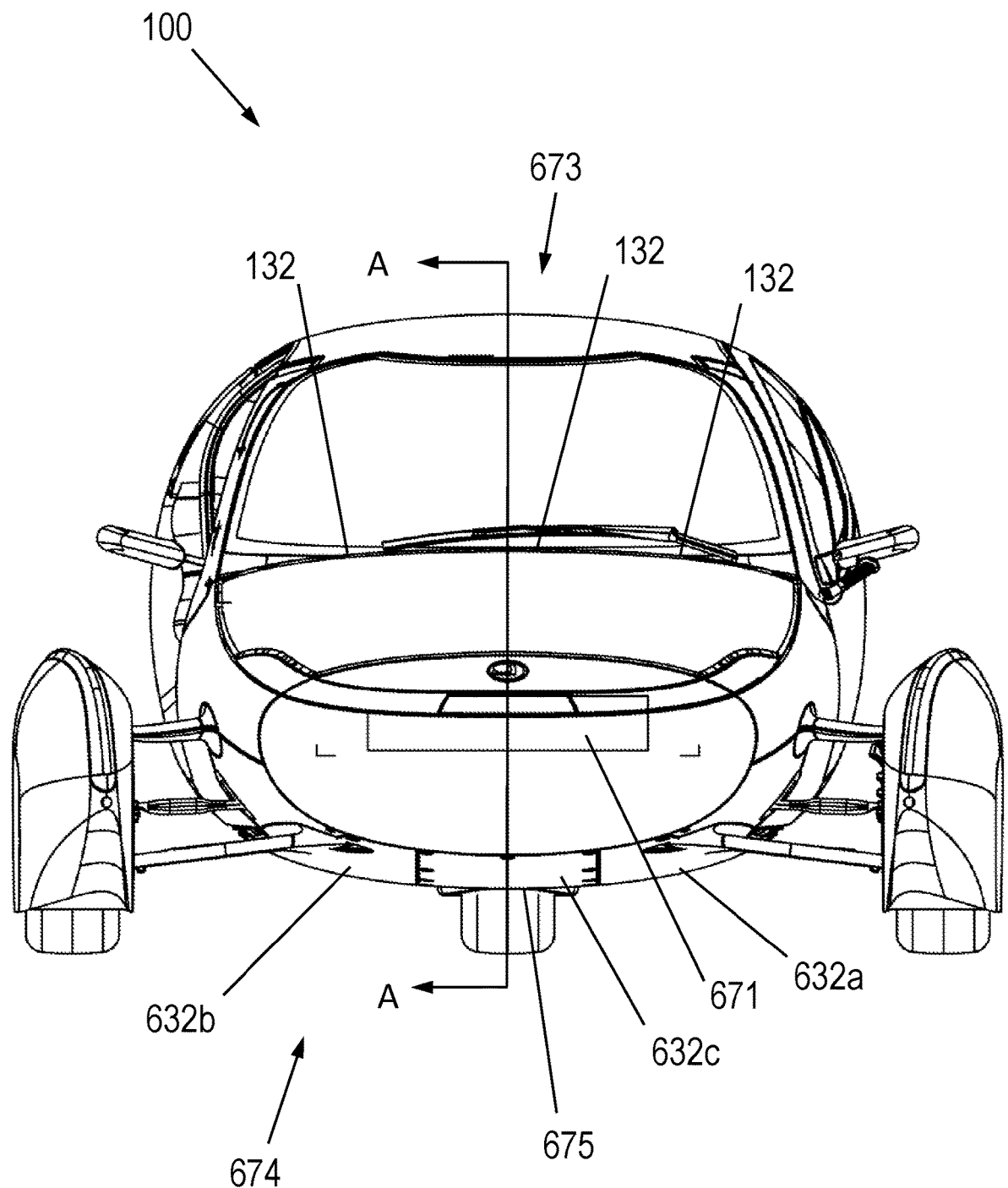
FIG. 3 illustrates a front view of an aerodynamic vehicle including an aerodynamic heat exchanger, according to an embodiment of the present invention.
Figure 4:
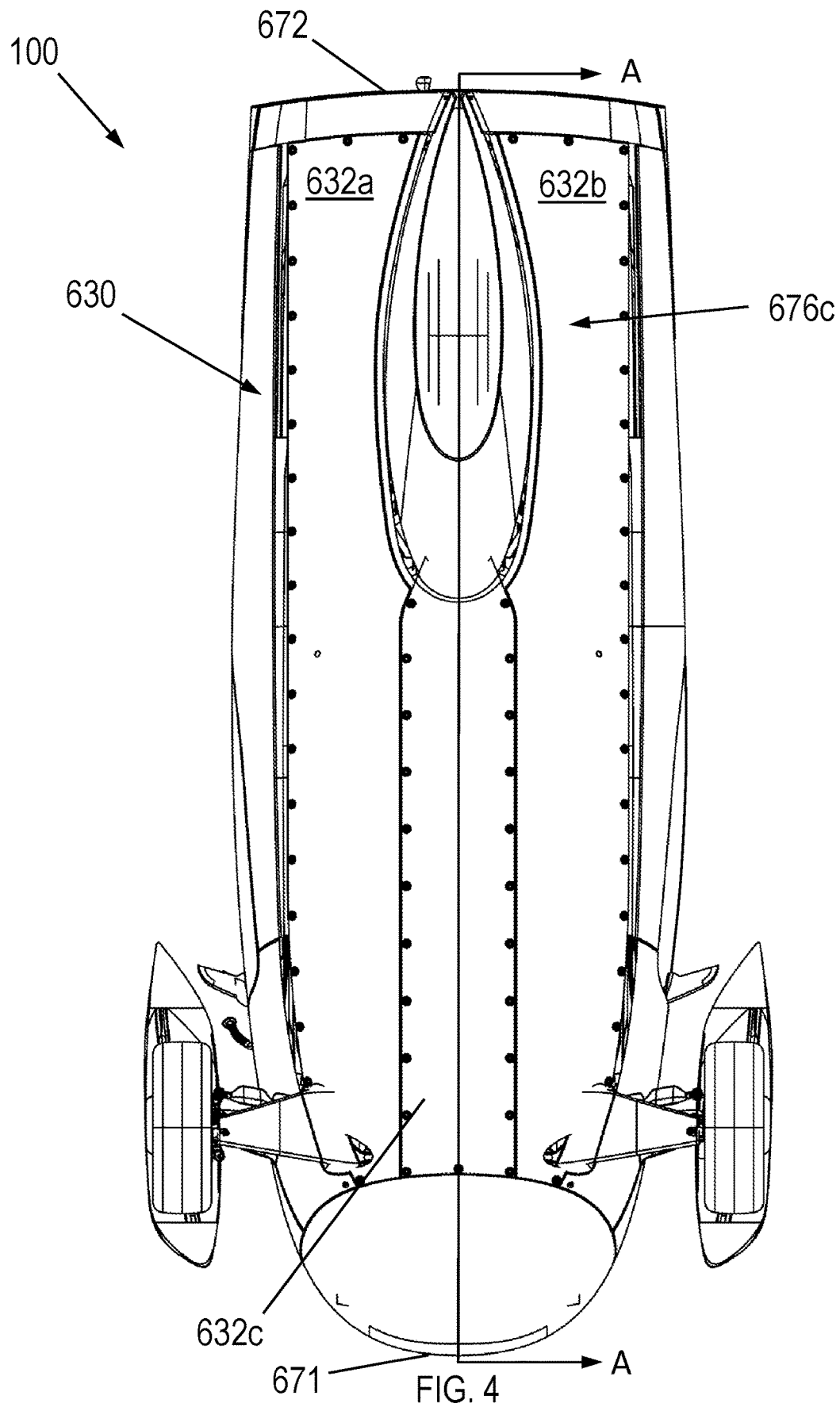
FIG. 4 illustrates a bottom view of an aerodynamic vehicle including an aerodynamic heat exchanger, according to an embodiment of the present invention.
Figure 5:
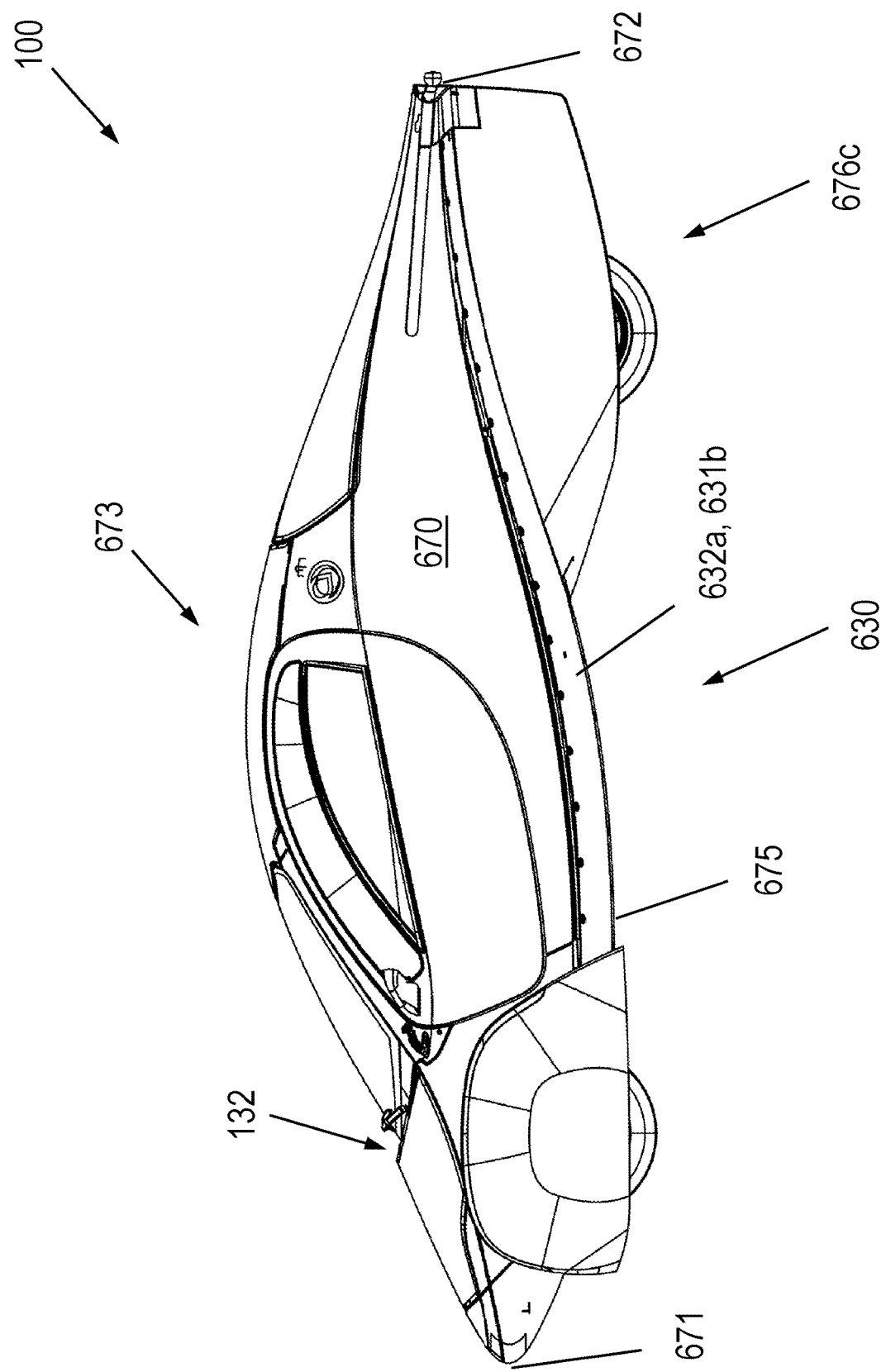
FIG. 5 illustrates a right-side view of an aerodynamic vehicle including an aerodynamic heat exchanger, according to an embodiment of the present invention.

FIG. 1 also shows an inner heat exchange surface 631a of aerodynamic heat exchanger 630, which defines at least one of the interiorly-exposed surfaces from which the supplemental heat exchange system exchanges heat. FIG. 2 also shows an outer heat exchange surface 631b of aerodynamic heat exchanger 630. Therefore, according to the present invention, aerodynamic heat exchanger 630 represents a dual-mode heat rejection, or heat exchange, system capable of advantageously using either or both sides of the apparatus.

Figure 6:
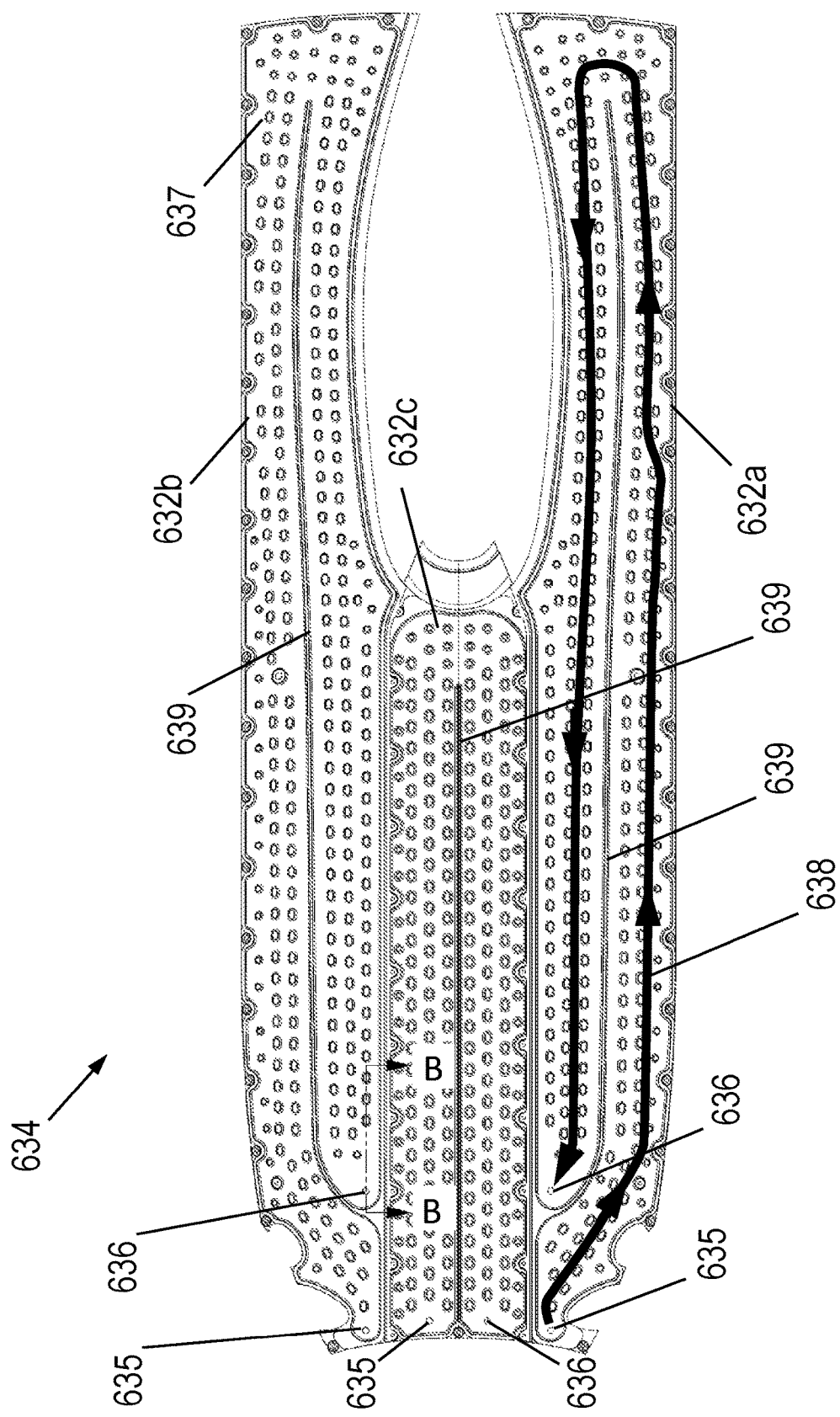
FIG. 6 illustrates a bottom, interior view of an inner chamber portion of an aerodynamic heat exchanger, according to an embodiment of the present invention.

FIG. 6 shows the interior side of an inner chamber portion 634 of aerodynamic heat exchanger 630. Inner chamber portion 634 may be manufactured in discrete portions corresponding to first, second, and third chambers 632a, 632b, 632c, respectively, or may be manufactured as a single element. Each chamber 632a-c may comprise an inlet opening 635, an outlet opening 636, indentations 637, which may be stamped features 637, a fluid channel 638, and a channel divider 639. Fluid channel 638 may comprise and be composed of an entirety of the wetted surfaces formed by portions of inner chamber portion 634 coupled and outer chamber portion 633. Alternatively, fluid channel 638 may comprise a streamline path of a plurality of flow paths, such as that shown in first chamber 632a of FIG. 6, extending between inlet opening 635 and outlet opening 636. The flow direction in any chamber, such as chambers 632a, 632b, 632c is exemplary, and the opposite flow direction may be used.

Figure 7:
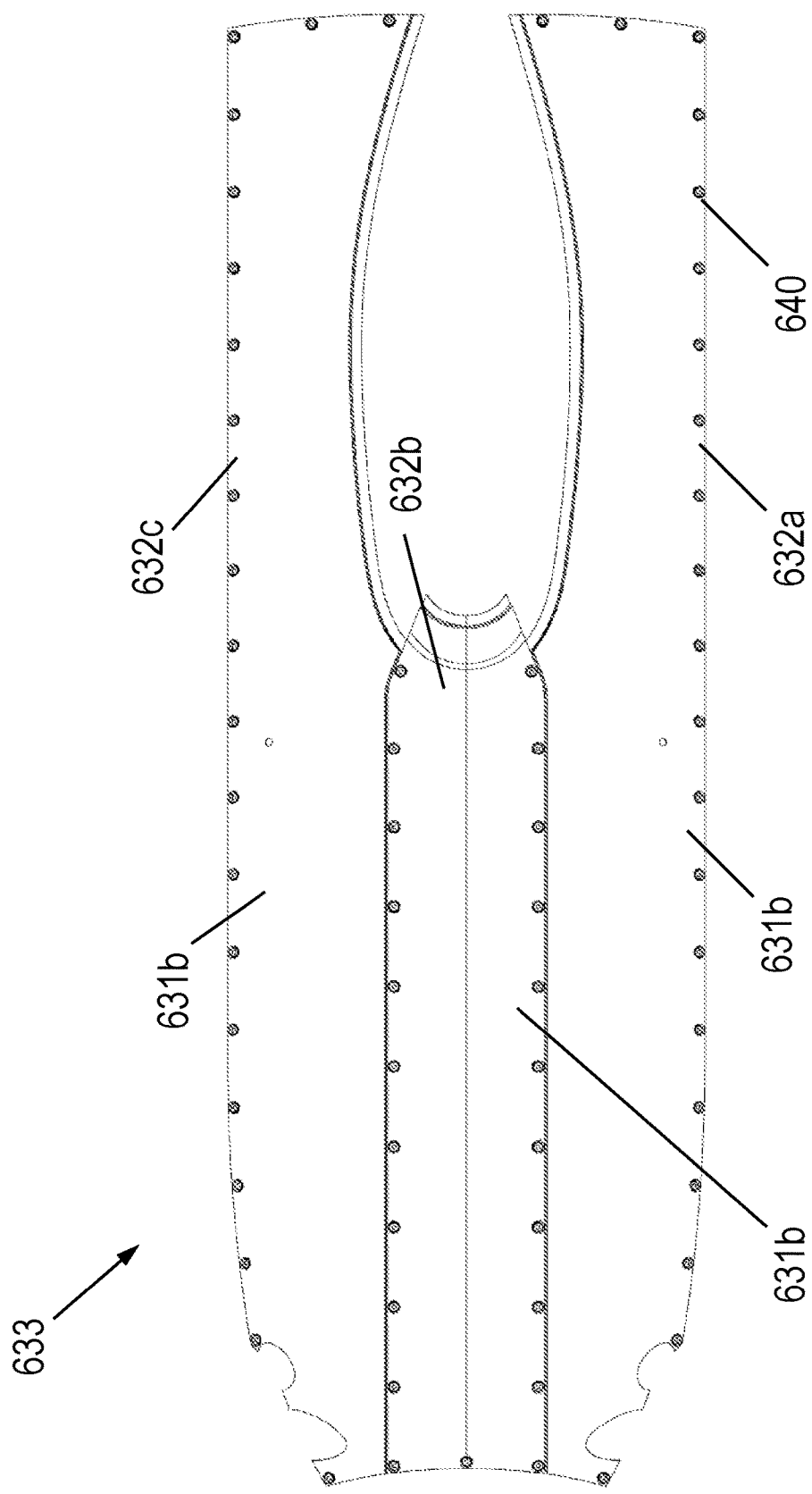
FIG. 7 illustrates a bottom view of an outer chamber portion of an aerodynamic heat exchanger, which may be a body panel of the aerodynamic vehicle, according to an embodiment of the present invention.
Figure 9:
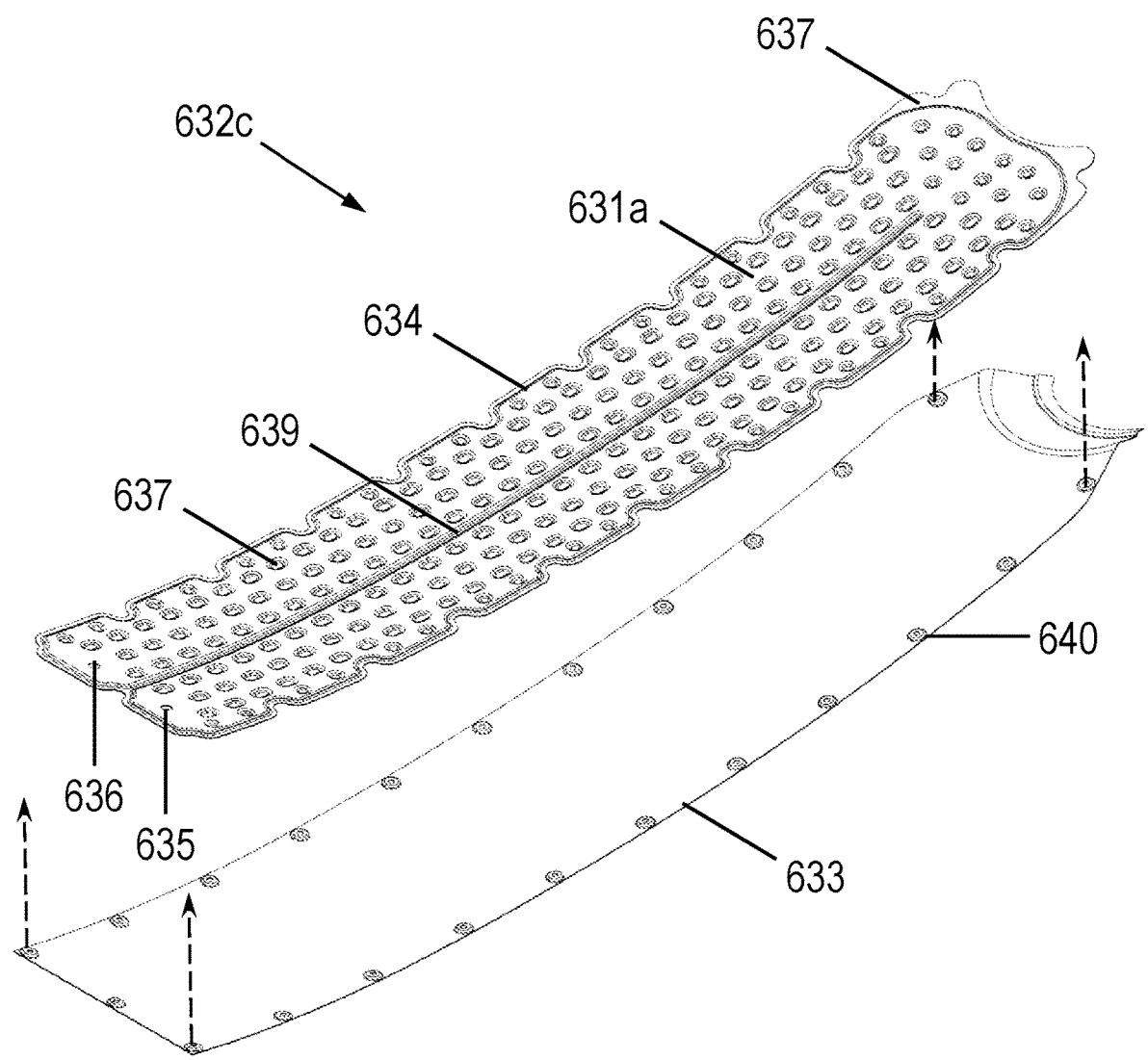
FIG. 9 illustrates a front, top, right-side, exploded, perspective view of a portion of a third chamber of an aerodynamic heat exchanger, according to an embodiment of the present invention.

FIG. 7 shows an outer chamber portion 633, which similarly may be manufactured as a single element and/or in discrete portions corresponding to first, second, and third chambers 632a, 632b, 632c, respectively. The outer chamber portion 633 may be formed to provide the desired aerodynamic characteristics including fastener assemblies 640 being formed substantially flush with the outer surface of outer chamber portion 633 such that the flow is not perturbed, remains laminar and/or is otherwise conducive to low drag. Such fastener assemblies 640 may be disposed along the entirety of the perimeter of each chamber 632a-c, or may be formed along a portion thereof. Other locations may couple to further components of aerodynamic vehicle 100 using suitable fasteners, adhesives and/or other coupling methods. FIG. 9 shows an exploded view of third chamber 632c comprising inner chamber portion 634 and how it may be coupled, or otherwise arranged to outer chamber portion 633.

Figure 8:
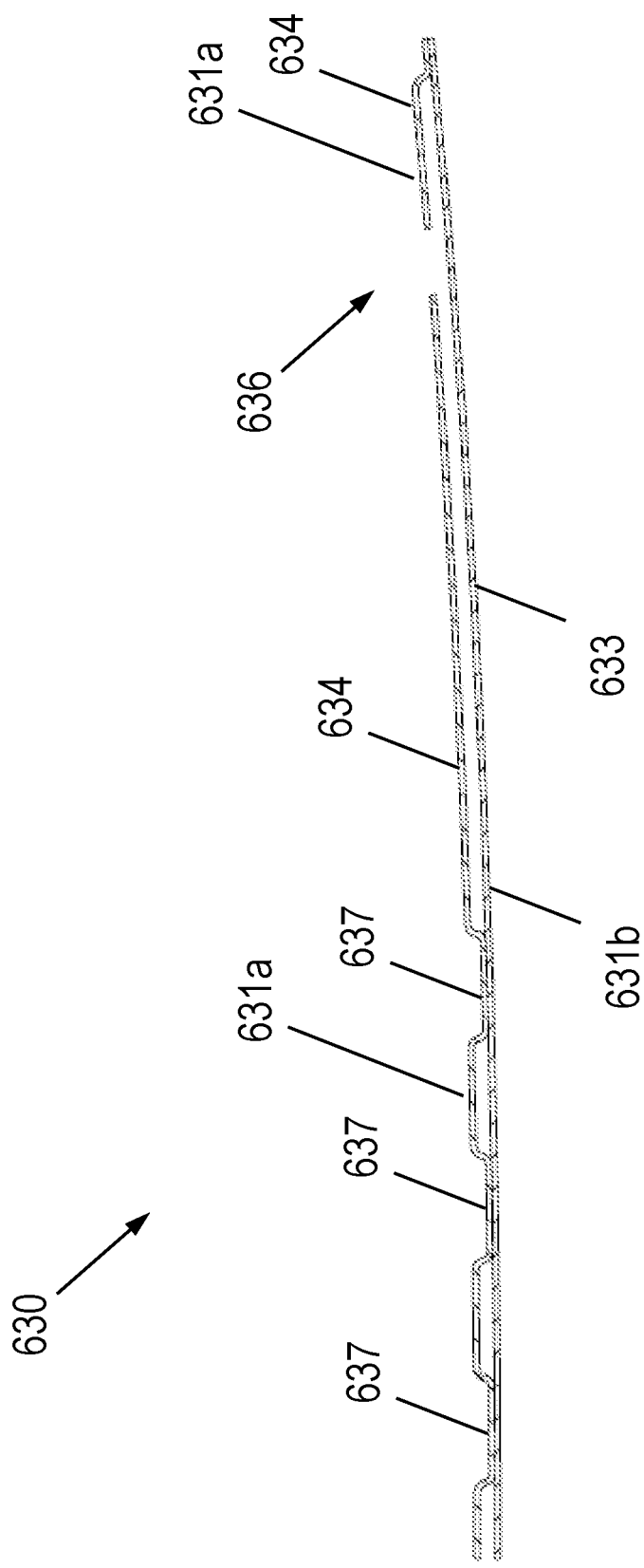
FIG. 8 illustrates a cross-sectional view taken along the line B-B in FIG. 6, which shows aspects of a second chamber of an aerodynamic heat exchanger, according to an embodiment of the present invention.

As shown in FIG. 8, a cross-sectional view of inner chamber portion 634 and outer chamber portion 633 of second chamber portion 632b along line A-A, illustrates the indentations 637 that provide mating surfaces for the outer chamber 633 and inner chamber portion 634. Indentations 637 may be formed by stamping and other manufacturing technologies, and joined by braising, welding, fastening or bonding with thermally conductive adhesive. The indentations 637 may comprise portions of inner and outer chamber portions 634, 633 that form flow barriers along a portion of indentation 637 where flow is to be prohibited, to promote a serpentine path, and to provide desirable mixing effects. Alternatively, the indentations 637 may comprise only inner chamber portion 634 in a space or void that exists between each indentation 637 and outer chamber portion 633. One or more channel dividers 639 may be used to form an extended fluid separation along a length of each chamber 632a-632c. The effect of each channel divider is to promote fluid migration to one or more offset dimensions between a physical distance from the inlet 635 and/or outlet 636, which also promotes more effective heat transfer. In the embodiment shown in FIG. 6, the one or more channel dividers force(s) the flow to travel the length of the section 632b and back, thereby providing maximum contact area between the fluid and the second chamber portion 632b radiator 631. Other macro flow paths 638 are also possible as facilitated by the one or more channel dividers 639 that may result in a serpentine path. Within the fluid chamber 638, indentations 637 may be uniform or otherwise discrete and may be arrayed in any suitable manner to cause turbulent flow that further increases the efficiency of heat transfer from the fluid to the aerodynamic heat exchanger 630.

Figure 10:
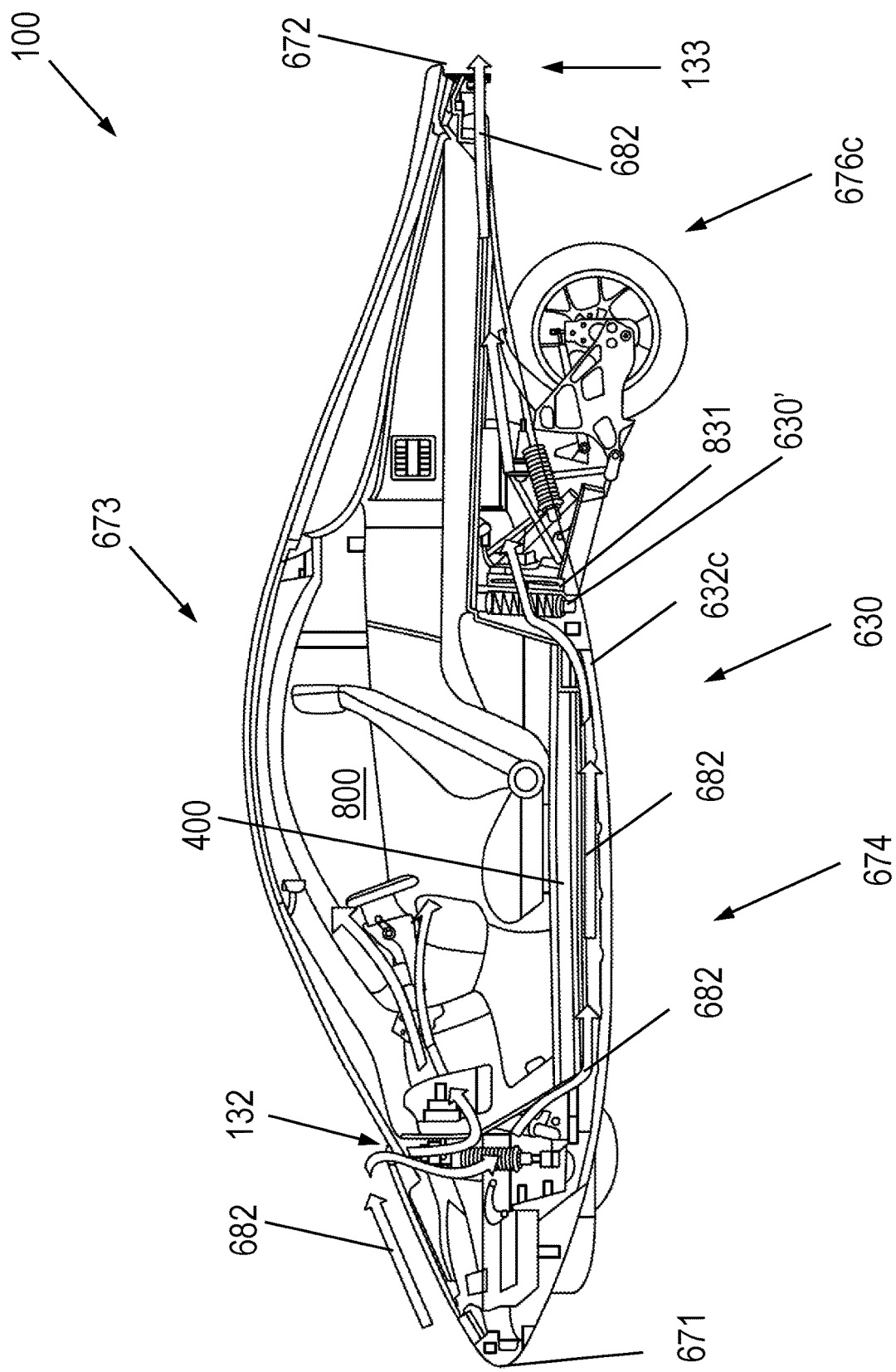
FIG. 10 illustrates a cross-sectional right-side view of an aerodynamic vehicle including an aerodynamic heat exchanger, taken along lines A-A of FIGS. 3 and 4, according to an embodiment of the present invention.

FIG. 10 illustrates an exemplary operation of the supplemental heat exchange system, including a schematic representation of an internal airflow path 682. As may be observed, for purposes of illustrating the functionality of the supplemental heat exchange system, internal airflow path 682 originates proximate the front end 671 and along the exterior of aerodynamic vehicle 100. Internal airflow path 682 then passes through an air inlet 132, which may be a gap or opening between the cowling and/or windshield. From air inlet 132, internal airflow path 682 passes through various interstitial cavities, such as ductworks, airflow channels, general voids formed by empty space between components, etc., within front end 132. At least a portion of internal airflow path 682 may be used for ventilation air as required or demanded by cabin 800. Then internal airflow path 682 may pass along the inner heat exchange surface 631a of aerodynamic heat exchanger 630, proximate lower body portion 674. Importantly, here, a battery assembly 400 may be mechanically decoupled, or otherwise spatially offset, from the aerodynamic heat exchanger 630 to form an interstitial cavity therealong and forming a portion of internal airflow path 682. This advantageously provides for heat transfer along inner heat exchange surface 631a of aerodynamic heat exchanger 630. Notably, inner heat exchange surface 631a may end from proximate front end 671 to proximate trailing end 672; however, as shown in FIG. 10, third chamber 632c terminates at a distance from trailing end 672 to provide space for third wheel assembly 676c. One or more fans 831 may be disposed within internal airflow path 682 downstream of battery assembly 400. And, as previously described, additional heat exchanger 630' may be disposed proximate one or more fans 831, which may provide additional heat exchange capacity to transfer heat to the airflow passing along and/or within internal airflow path 682. In an alternative embodiment, additional heat exchanger 630' provides a bypass configuration to allow flow to bypass the same to fan 831. The aerodynamic heat exchanger 630 and additional heat exchanger 630' may run simultaneously or independently, i.e., only one being used at any given time, and such control strategies, physical arrangement, and/or general functionality shall be construed as non-limiting.

An air outlet 133 may be disposed at, or proximate to, trailing end 672, and may be configured with an airflow nozzle to direct the stream of airflow in any manner desired. Alternatively, air outlet 133 may be a slotted-opening, and/or substantially hidden from view, such as along the perimeter of a license plate or other component. As will be described, this arrangement takes advantage of one or more locations where some amount of airflow separation naturally occurs about aerodynamic vehicle 100. Alternative locations of the air inlet and/or outlet 132, 133, may be employed, and those locations shown in FIG. 10 and elsewhere herein shall be construed as non-limiting. Similarly, alternative locations for various internal components, may be employed and shall be construed as non-limiting.

Figure 11:
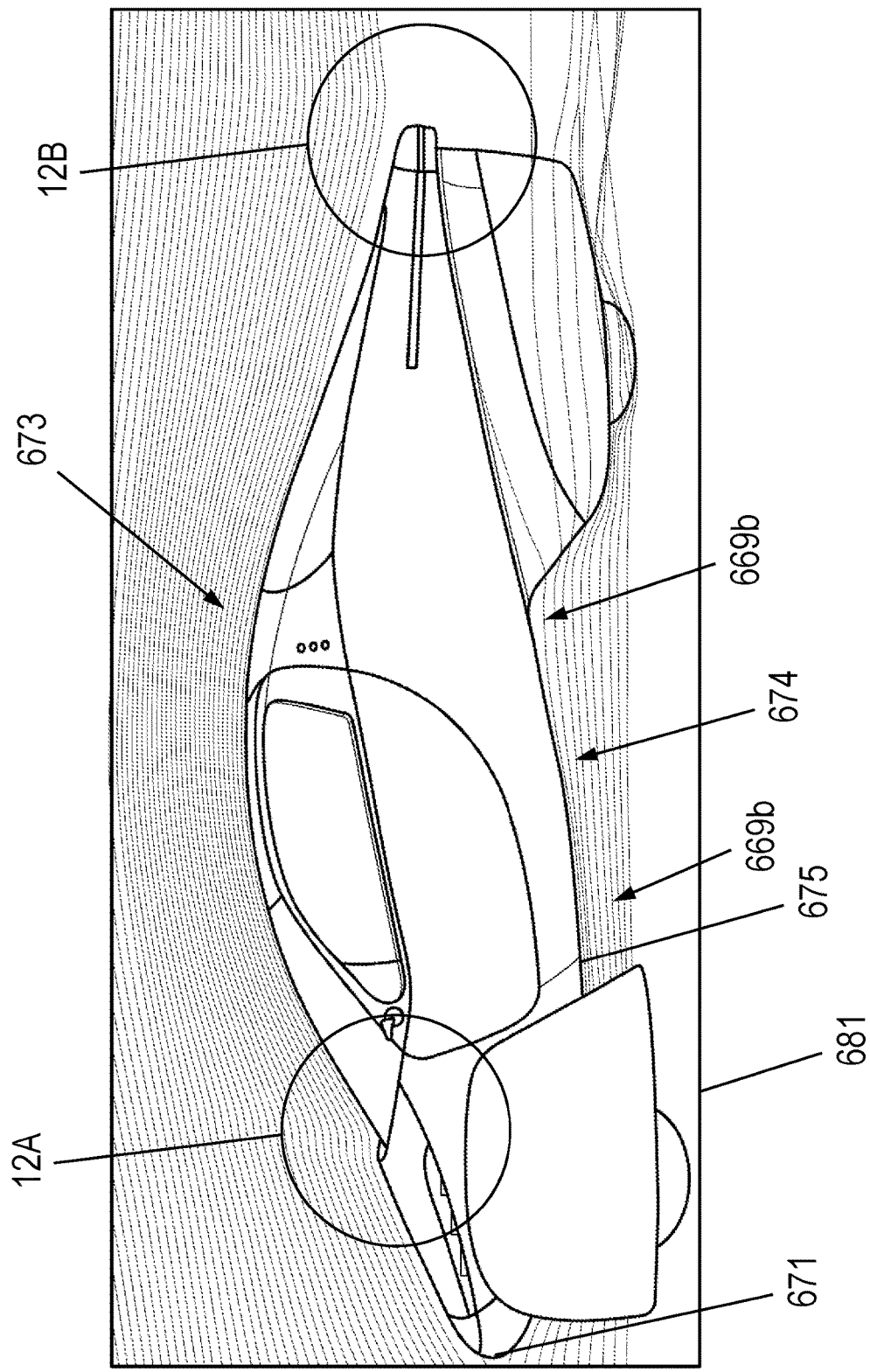
FIG. 11 illustrates a right-side view of an aerodynamic vehicle including an aerodynamic heat exchanger showing streamlines along the center thereof, according to an embodiment of the present invention.

FIGS. 1-12B illustrate structures of an embodiment of the aerodynamic vehicle 100 that result in a low total drag coefficient, of about $C_d$=0.13, as can be measured using computational models and tools for fluid dynamics, CFD, and other simulations showing the results in the high aerodynamic performance of the inventive aerodynamic heat exchanger 630 to provide increased fuel economy and/or vehicle driving range-as in the case of an electric battery powered vehicle. CFD simulations and analysis are known tools and although a thorough explanation lies beyond the scope of this disclosure, an elementary explanation may aid in understanding of the underlying theory from which the structure of the present invention relates. CFD applies to a body, such as body 670, or more completely aerodynamic vehicle 100, surrounded by a fluid flow having boundary conditions at some distance away from the body. Boundary conditions 681 along the perimeter as shown in FIG. 11 is one such example, where conditions that accurately define such characteristics as a uniform flow field and also rigid bodies such as the road surface. The flow field for which a solution is sought then lies within that boundary 681 and around vehicle 100, which requires the solution of three-dimensional Navier Stokes equations. The flow field is assumed to be a continuous medium that is discretized into points along the flow field, then data values are determined using tools including a numerical solver and arranging the terms in an appropriate way, such as, for example, in one or more tri-diagonal matrices, characteristics including but not limited to velocity, V, pressure, p, and shear stress τ. Such tools provide data values in an iterative vehicle design, where structural aspects can be varied and aerodynamic flow field effects observed. Other tools include vehicle models and/or prototypes designed for small-scale wind tunnel testing and/or full- scale analysis using sensors, etc., so as to evaluate designs. While other vehicle designers also conduct aerodynamic tests and/or experiments, problems such as positioning a spoiler or other protuberance that is forward of the heat exchanger extending continuously from side-to-side (body width, or width of the heat exchanger) results in poor aerodynamic performance. Again, the present invention solves at least this problem.

Figure 12A:
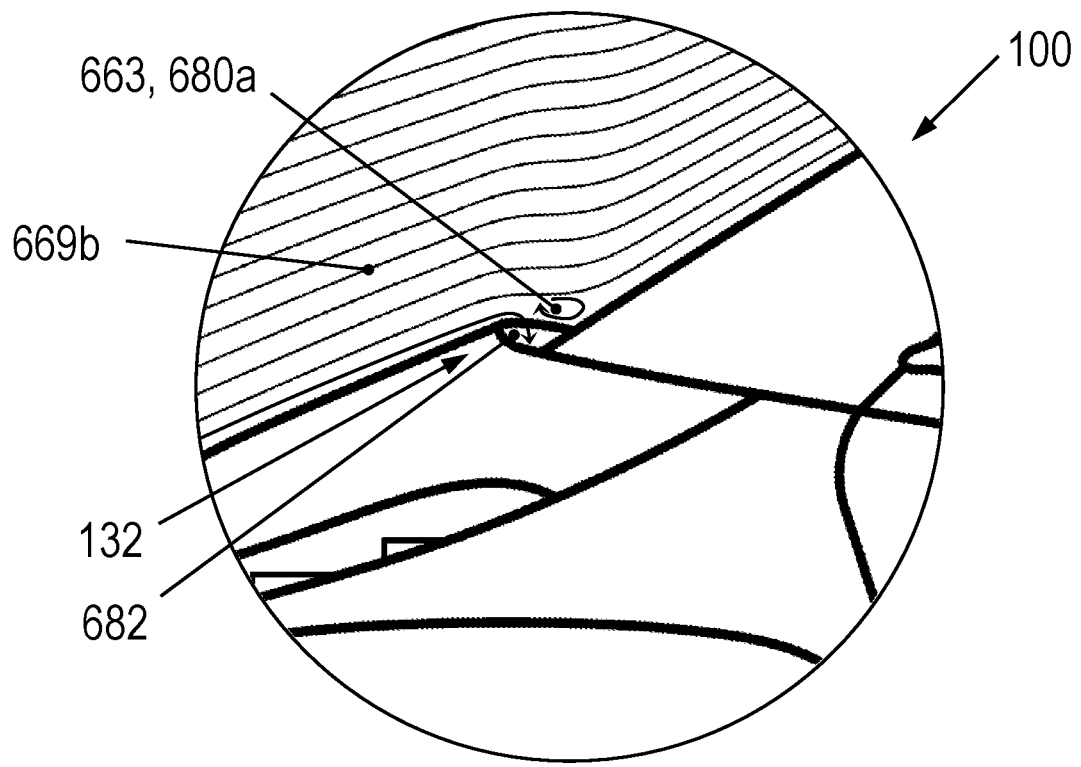
FIG. 12A illustrates an enlarged view, taken from FIG. 11, of an aerodynamic vehicle including an exemplary airflow inlet, according to an embodiment of the present invention.
Figure 12B:
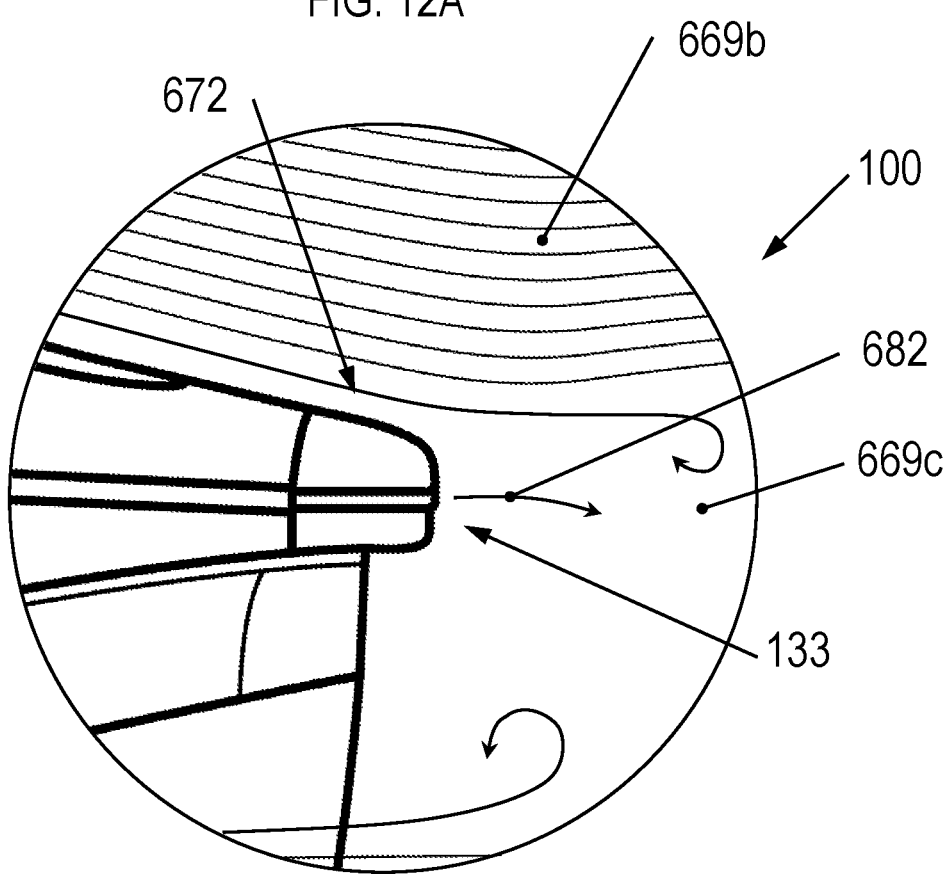
FIG. 12B illustrates an enlarged view, taken from FIG. 11, of an aerodynamic vehicle including an exemplary airflow outlet, according to an embodiment of the present invention.
Figure 13:
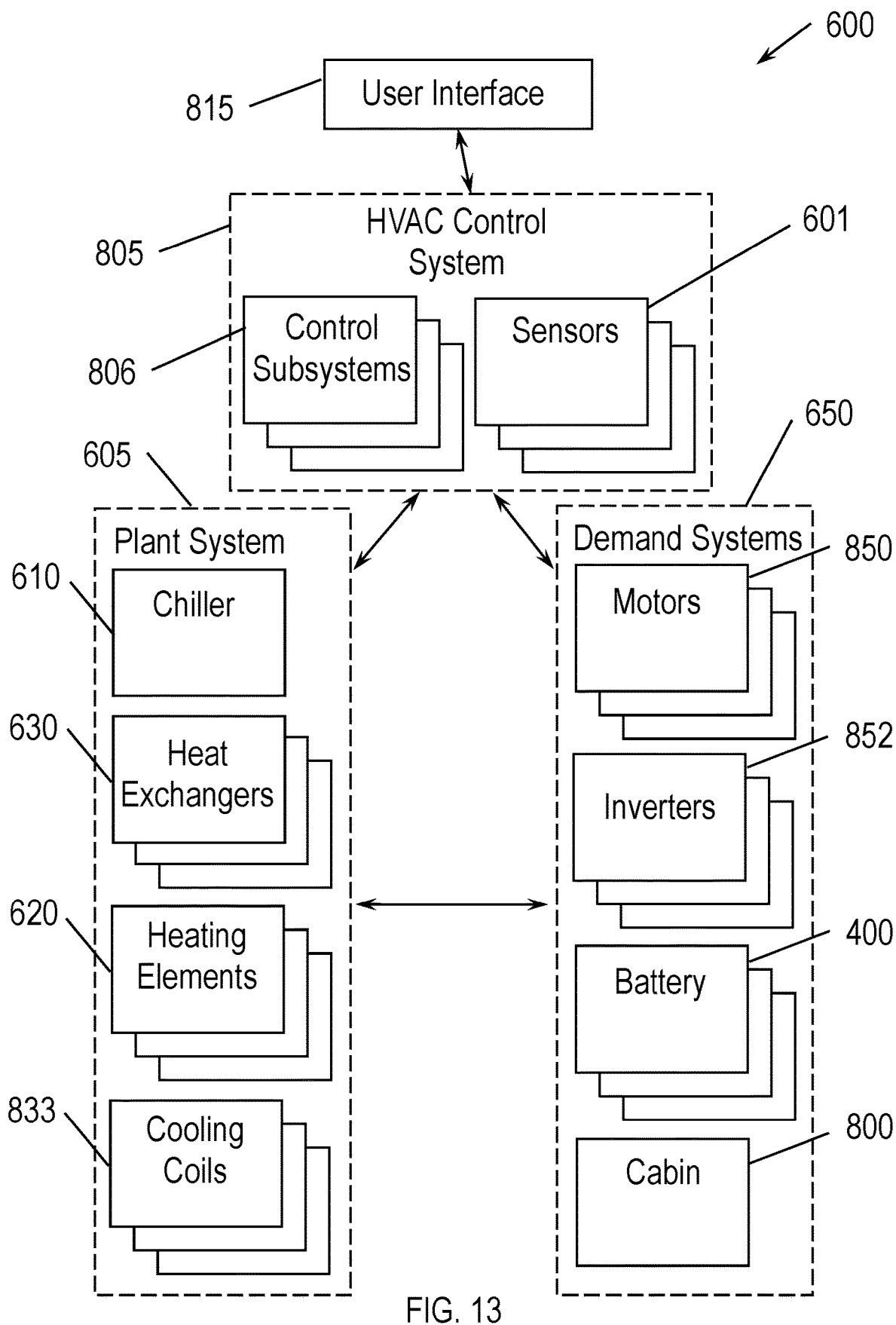
FIG. 13 illustrates a schematic diagram of an exemplary HVAC system layout, according to an embodiment of the present invention.
Figure 14:
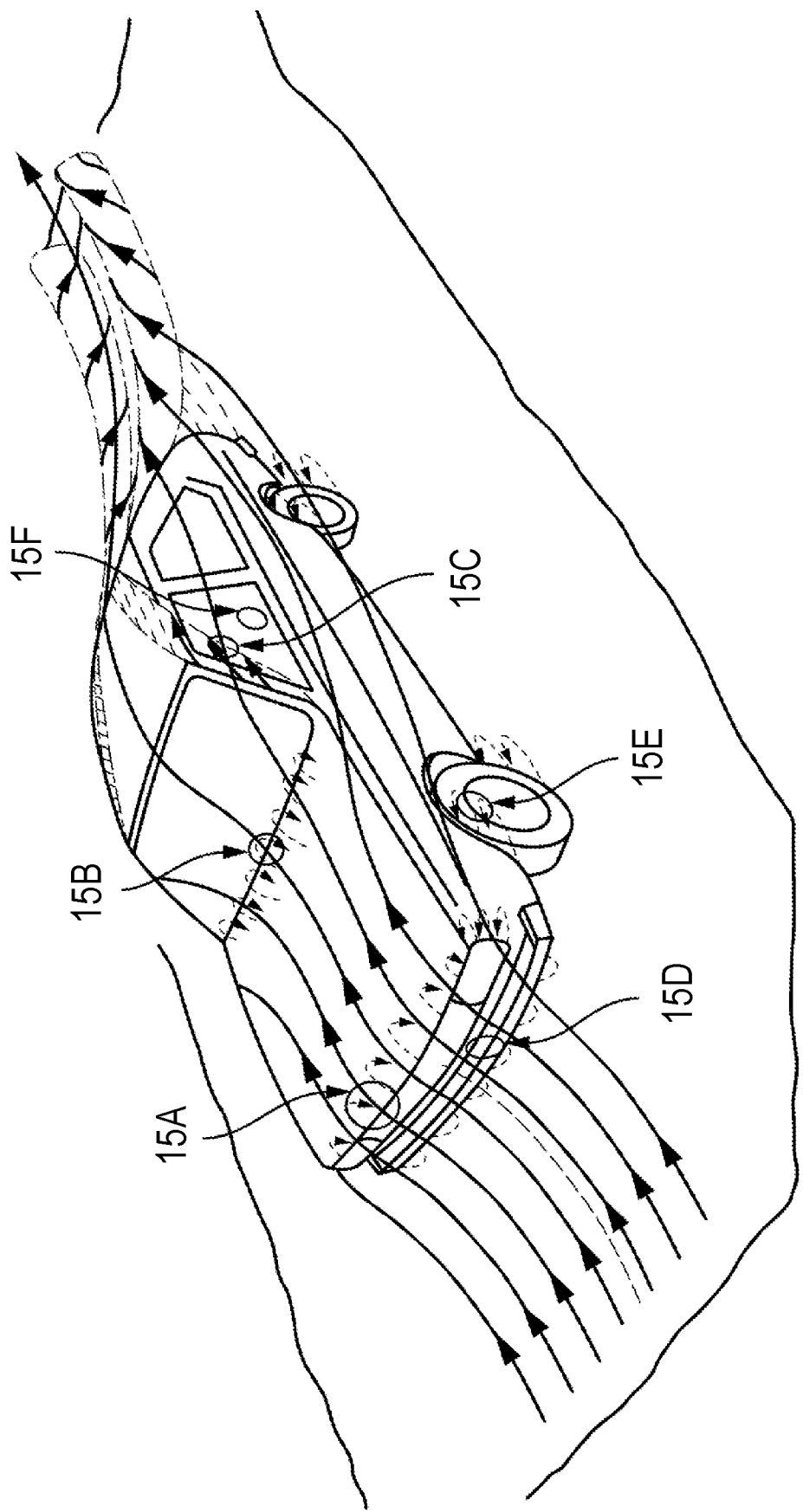

Referring to FIGS. 11 and 12A-12B, aspects of air inlet and outlet 132, 133, can be observed in the context of CFD, according to the present invention. FIG. 11 generally shows laminar flow regions 669b according to the streamlines shown. Exemplary flow characteristics are provided in the enlarged view of FIGS. 12A and 12B, taken from FIG. 11. In FIG. 12A, a recirculation region formed as a flow separation region at body 680a, which contributes to some extent body drag 663. Internal flow path 682 can also be seen to pass through air inlet 132, and the flow separation region at body 680a, laminar region 669b, and body drag 663 are seen to be substantially unaffected by virtue of the location shown. Note that a thorough discussion of the types and categories of aerodynamic drag are described later on herein. Referring to FIG. 12B, internal airflow path 682 is shown to exhaust out of air outlet 133 and pass within a turbulent region 669c, which may include vortices, eddies, and/or other features characterized by turbulence and flow separation for slender bodies of the type comprising aerodynamic vehicle 100. Again, here, the laminar region 669b remains substantially unaffected by virtue of air exhaust to a location that would otherwise be turbulent and/or characterized by flow separation. In this manner, the supplemental heat exchange system provides for additional capacity when needed, i.e., when the primary passive heat exchange via outer heat exchange surface 631b exhibits insufficient capacity, while maintaining desirable aerodynamic performance of the vehicle 100, such as low drag, low energy consumption, and/or high fuel economy.

Having described certain structural attributes, aerodynamic heat exchanger 630 is now described in the context of its configurations within HVAC system 600. FIG. 13 is a schematic view illustrating the HVAC system 600 wherein each type of component may contain one or more of the same component, but preferably has the quantity shown, i.e., one or multiple. An HVAC system 600 as represented in FIG. 13 is useful for illustrating the environment in which the present invention pertains and is provided for in the context of its functional components. The HVAC system 600 may comprise plant and demand system 605 and 650, respectively, as well as controls 805 thereof and a user interface 815. The phrase "user interface" in this context may refer to any type of surface capable of receiving a command from a user within a vehicle, including but not limited to a touchscreen, a touchscreen having one or more knobs and/or buttons protruding therefrom, and a digital display with or without control knobs and/or buttons.

A plant 605 typically defines where energy is transferred, or transformed, from one form to another, and it may include a chiller 610 that defines a source of cooling, one or more heating elements 620 which define a source of heating. And then a plant 605 may also include various exchangers, such as an aerodynamic heat exchanger 630 to reject heat to the ambient, but also heat exchangers disposed within the vehicle 100, such as for exchange of heat among dissimilar media, like refrigerant-to-water, refrigerant-to-air etc. Plant 605 may also include cooling coils 833 to condition an airflow conveyed by an airside system (not shown here), such as a fan, and passed through air flow channels and vents to cabin 800. The heating elements in this context may be one or more electric heating coil, but other types of heating elements are considered herein as well.

Demand systems 650 may comprise motors 850, inverters 852, batteries 400, and a cabin 800 and/or other components that require heating, ventilation, and/or air conditioning. Components comprising demand systems 650 may be in any arrangement of thermal communication with said plant system 605 components that is useful to achieve the desired objective. Furthermore, each class or type of subcomponent for which demand systems 650 comprises may be circuited to/from a dedicated chiller 610, a dedicated heat exchanger 630, a dedicated heating element 620, and/or a dedicated cooling coil 833. Cooling energy may originate in the plant 605 within the chiller 610 via a compressor-powered refrigerant loop, or with "free cooling" employed by one or more aerodynamic heat exchangers 630—a heat transfer method that takes advantage of the ambient temperature being colder than the temperature of the demand system 650 component to be cooled. Similarly, heating energy may originate in the plant 605 within a heating element 620, or with "heat pump" activation of the chiller cycle, or with "free heating" employed by one or more aerodynamic heat exchangers 630. In general, separate heat exchangers 630 are characterized as having a dedicated inlet and outlet, but other characterizations fall within the scope of this disclosure as have been described herein. In an example embodiment of potential combinations of plant 605 and demand 650 systems components, vehicle 100 comprises three aerodynamic heat exchangers 630, two heat exchangers mechanically and thermally coupled to the battery 400 and cabin 800, and one aerodynamic heat exchanger 630 mechanically and thermally coupled to the motors 850 and inverters 852.

The user interface 815 can be formed as a display having a touchscreen designed to give the user control over many aspects of the plant and demand systems 605, 650 of the vehicle 100. For example, the user interface 815 can be used to control temperature, humidity, and/or ventilation conditions of the various components defined by demand systems 650. Passenger-input to the user interface 815 may determine whether cabin 800 demands heating, cooling and/or ventilation, whereas computer-controlled commands determine input and output to other demand systems in a passive, i.e., non-passenger-input manner. Furthermore, via the HVAC control system 805, the user interface 815 may provide airflow and temperature control within discrete locations of the cabin 800, such as control to individual passengers or the driver, and also to cabin 800 locations, such as the floor, chest level, head level, ceiling, or windows via selection of appropriate airflow channels and/or directional control of vanes.

HVAC control system 805, and control subsystems 806 thereof, can include controllers, processors, memory, and storage. The HVAC control system 805 can send instructions to the airside and plant systems 605, 820. The HVAC control system 805 can also receive feedback from conditions of the various components of demand systems 650, via various sensors 601, e.g., for temperature, humidity, voltage, amperage, impedance, etc., and/or cameras, to further specify desirable conditions therein and thereof. Furthermore, the HVAC control system 805 can send information to the display of the user interface 815 to display setpoints and the like to be viewed by the user or controlled automatically by the control system 805. Additionally, all manner of sensors may be deployed throughout locations in the system 600, such as thermistors and the like, to form the basis of controlling intelligently the characteristics of the demand systems 650 and/or plant system 605.

FIGS. 14 and 15A-15F illustrate certain aerodynamic aspects and parameters relating to the heat exchanger 630 formed with the structures and panels of an aerodynamic vehicle 100. As used herein, many of the drag forces acting on a vehicle and their interrelated design factors are shown the Table 1 as provided in FIG. 16 for ease of describing the claimed invention.

Figure 16:
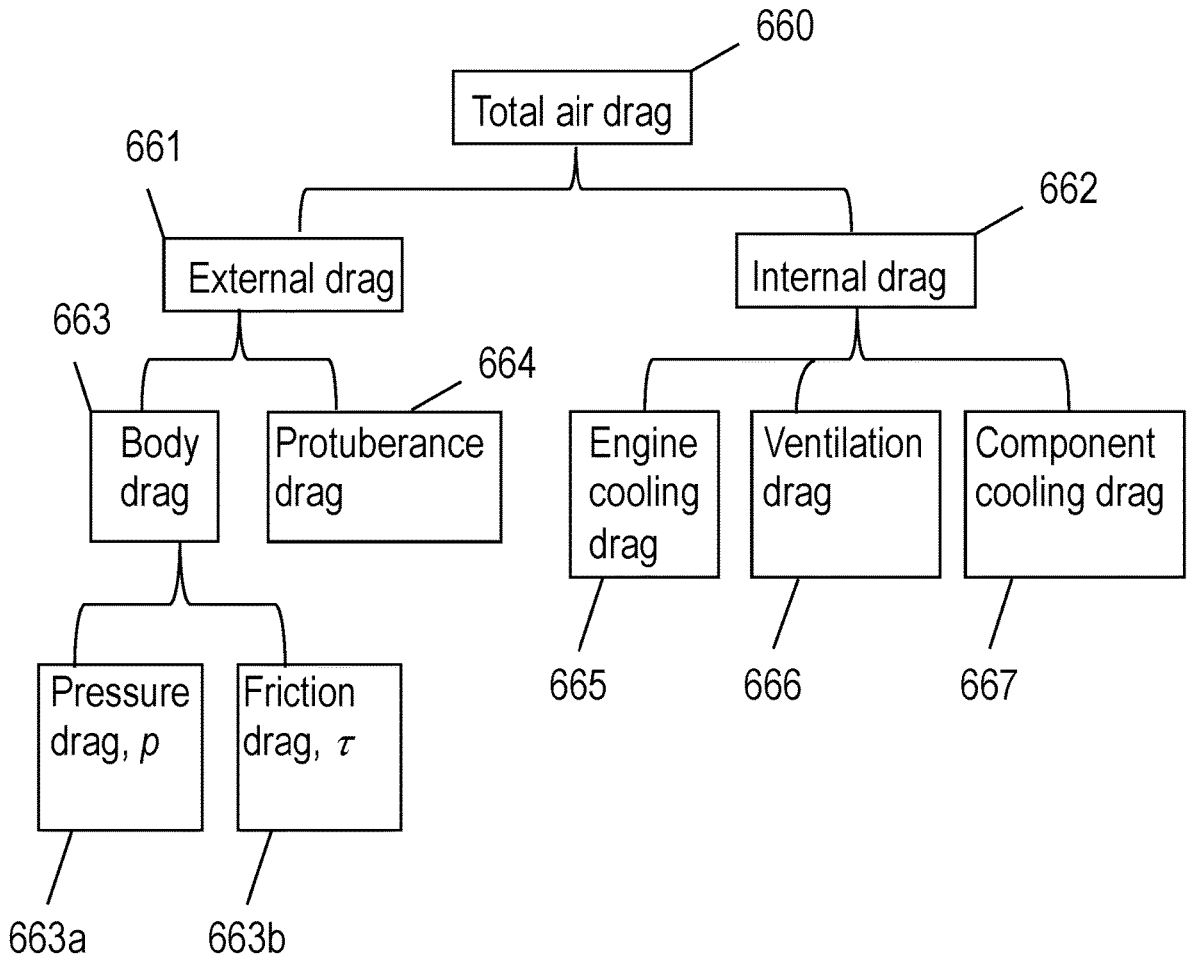
FIG. 16 is a picture illustrating the components of the total vehicle drag, according to an embodiment of the invention.

According to FIG. 16, total air drag 660 acting on a vehicle includes external drag 661 and internal drag 662 components. External flows in this context, from which external drag 661 results, refers to unconfined flows occurring over surfaces including, but not limited to, one-sided surfaces, flat plates, circular cylinders, vehicle body panels, and other surfaces. External drag 661 can then include body drag 663 and protuberance drag 664, where the former generally refers to drag from a primary body, and the latter generally refers to drag from an object or component that protrudes outwardly from the surface of the primary body. Protuberance drag 664 may also account for the confluence of airflows, i.e., localized mixing, between the protruding object and the body from which it extends. Body drag 663 can be decomposed into mutually-orthogonal forces, pressure drag 663*a*, $p$, which acts normal to the surface of a body, and friction drag 663*b*, a shear stress, $\tau$, that acts tangential to the surface.

Internal flows in this context, from which internal drag 662 results, refers to flows occurring in confined passages of various regular or irregular, singly or doubly connected, constant or variable cross sections including, but not limited to, circular, rectangular, triangular, annular, and other cross sections. Internal drag 662 can include engine cooling drag 665, ventilation drag 666, and component cooling drag 667.

FIGS. 14 and 15A-15F further illustrate some of the ways in which total air drag 660 traditionally manifests in the form of a flow field around a vehicle. Such a conventional flow field is characterized by numerous flow separations, a concept related to drag that will be further elaborated upon below. The following qualitative explanation regarding FIGS. 15A-15F demonstrates some of the types of drag that typically occur, but additional subcategories of drag may be applicable thereto, and additional formulations as to the decomposition of total air drag 660 may be similarly applied. Therefore, the application of the FIG. 16 framework to the various figures and/or in the specification shall be construed as non-limiting, and is generally being used to aid in understanding of central concepts pertinent to the present invention.

In contrast to the flows around aeronautical configurations, the road vehicle flow field is characterized by flow separation regions both large and small. These flow separation regions may exhibit quasi-two-dimensional or fully three-dimensional flow fields. In the case of the former, the representative flow fields shown in FIGS. 15A, 15B, and 15D-15F represent quasi-two-dimensional flow fields. In contrast, FIG. 15C as illustrated represents a fully three-dimensional flow field. The smaller regions of local separation occur at body appendages, like protuberances 664, including headlights, mirrors, door handles, windscreen wipers, and other appendages. Large areas of separated flow are present at the trailing perimeter of the vehicle body and on the underside or undercarriage of a conventional vehicle, as in FIG. 15D, where the flow is disturbed by mechanical and structural elements and by the rotating wheels.

Figure 15A:
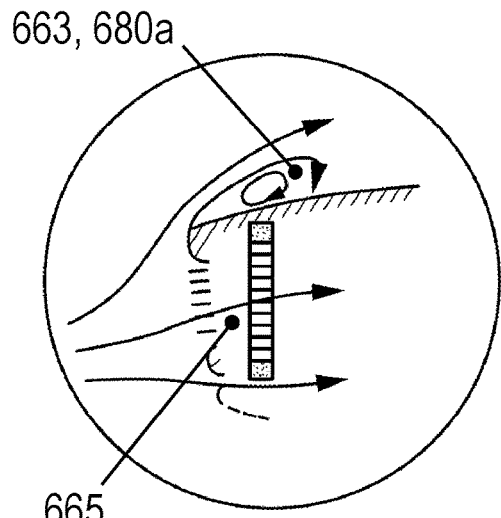
FIG. 15A illustrates an enlarged, cross-sectional, right-side view of flow through the front-end grille and radiator, with flow separation, body drag, and engine cooling drag thereof.
Figure 15B:
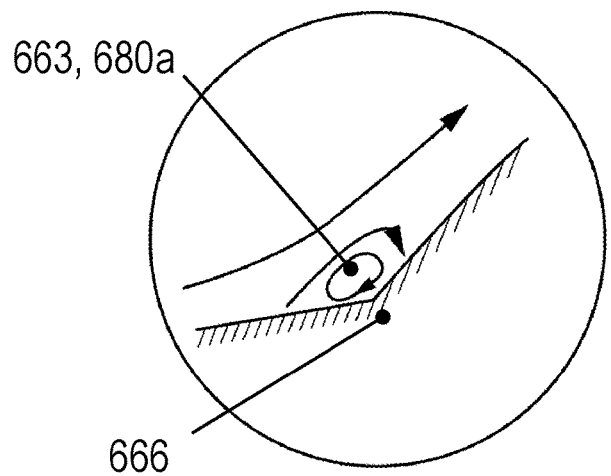
FIG. 15B illustrates an enlarged, cross-sectional, right-side view of flow at the intersection of the hood and the windshield, with flow separation, body drag, and ventilation drag thereof.
Figure 15C:
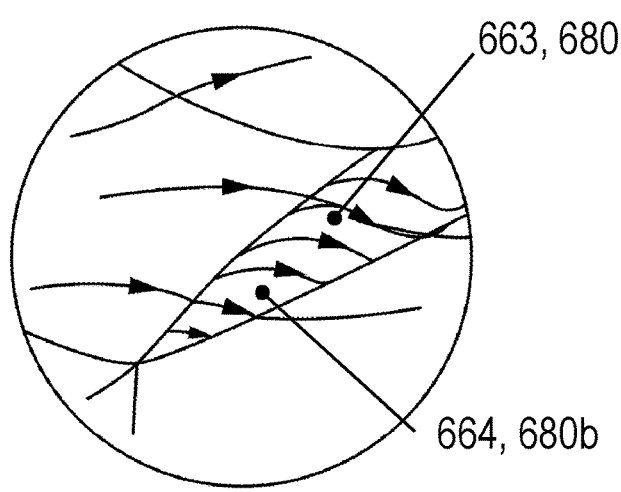
FIG. 15C illustrates an enlarged, perspective view of flow over the side of the windshield along the driver's-side door, with flow separation and body drag thereof.

In the case of the front-end radiator, for example as in FIG. 15A, this form of heat exchanger relies on air being forced in between the array of small fins and tubes—a process that increases drag, and which is classified as engine cooling drag 665. Such front-end conventional designs may also include body drag 663 resulting from a body flow separation region 680*a*. FIG. 15B illustrates the intersection of the hood and the windshield, with body drag 663 resulting from a body flow separation region 680*a*, and ventilation drag 666 resulting from a cowl inlet for fresh air to the cabin. Ventilation drag 666 with cowl inlet is representatively shown in FIG. 14. FIG. 15C illustrates how flow over the side of the windshield along the driver's-side door experiences body drag 663 resulting from a body flow separation region 680*a* and localized protuberance drag 664 and associated protuberance flow separation region 680*b* resulting from a side-rear view mirror (not shown) that extends outwardly from the body of the vehicle.

Figure 15D:
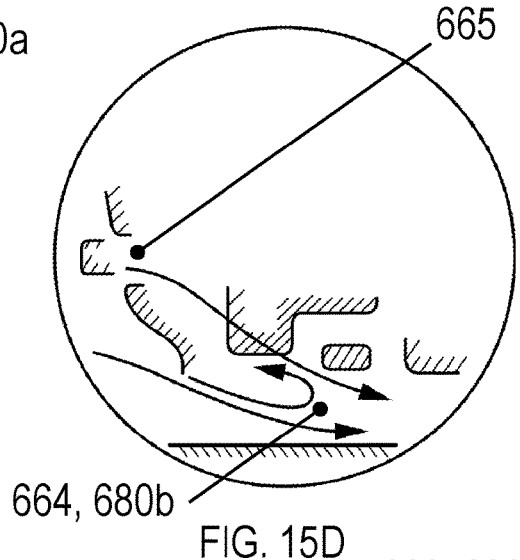
FIG. 15D illustrates an enlarged, cross-sectional, right-side, view of flow though the front-end grille and fender spoiler, with body drag, protuberance drag, and engine cooling drag thereof, and with flow separation occurring underneath the vehicle.

FIG. 15D illustrates, in a centrally-disposed cross-section, flow though the front-end grille resulting in body drag 663, 680*a* and engine cooling drag 665, and a front fender spoiler, which may be characterized as protuberance drag 664, 680*b* that extends underneath the vehicle and acts to form a larger effective front-end area, thus also increasing and contributing to body drag 663. In the case of an electric vehicle having an undercarriage base plate, for example, vehicle components forward of the heat exchanger, such as the suspension and openings in the undercarriage, effectively 'trip' the flow, causing the airflow to become turbulent—a design aspect that also increases drag. These designs may employ a spoiler, such as the spoiler as in FIG. 15D located on the front fender, to try to mitigate such drag effects, but the aerodynamic contribution to increased drag still remains. Also, the addition of such components employed to offset aerodynamic contribution add weight to the vehicle, thereby decreasing fuel economy and performance.

Figure 15E:
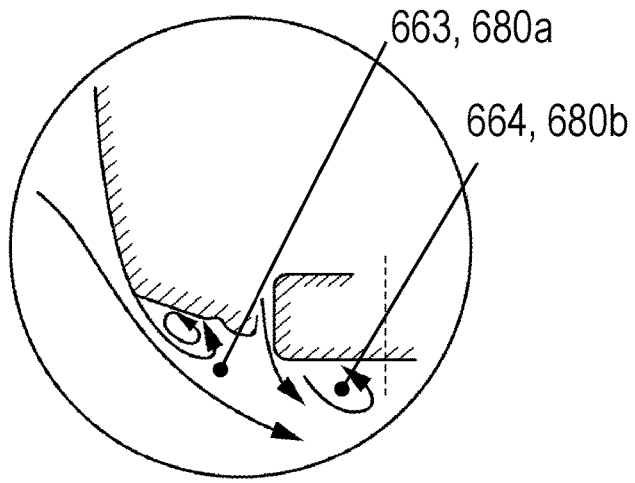
FIG. 15E illustrates an enlarged, cross-sectional, top view of flow around the driver's-side extending over the wheel, with flow separation, body drag, and protuberance drag thereof.
Figure 15F:
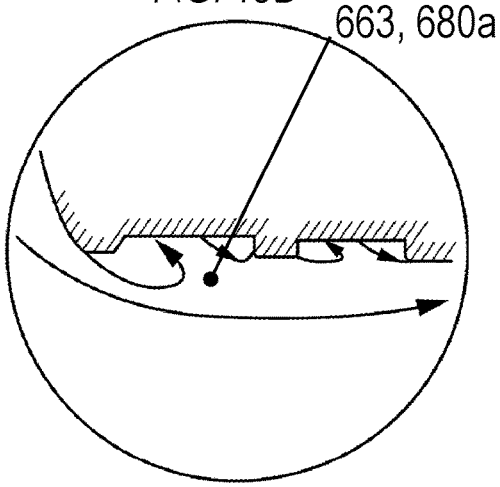
FIG. 15F illustrates an enlarged, cross-sectional, top view of flow around the driver's side extending over the front and rear doors of the vehicle, with flow separation and body drag thereof.

FIG. 15E illustrates, in a cross-sectional view, flow extending around the driver's-side body and wheel, body drag 663, 680*a*, and extending within the wheel to cool brakes, e.g., disk brakes, drum brakes, brake shoe, resulting in component cooling drag 667. The tire may also be characterized in terms of protuberance drag 664, 680*b* with flow interactions of the same with the surrounding vehicle body. Lastly, FIG. 15F illustrates a top view of flow around the driver's side extending over the front and rear doors of the vehicle, resulting in body drag 663, 680*a*. Each of the aforementioned examples include flow separation, which is representative of regions having eddies and/or recirculation regions.

Aerodynamic vehicle 100 including aerodynamic heat exchanger 630 is now considered in the context of heat transfer design aspects. Among the most important inputs for the thermal design of a heat exchanger are the dimensionless heat transfer coefficients. Depending on whether the heat exchanger design can be classified as having external flow or internal flow-analogous to the aerodynamic considerations of external drag 661 and internal drag 662 of FIG. 16 different models may be used to approximate design aspects thereof. For example, an external flow heat exchanger, such as a surface exposed to ambient air flow, velocity and temperature boundary layer theory may be more suitable for approximating conditions therealong. As another example, for predominantly an internal flow heat exchanger, potential flow theory may be more suitable for approximating conditions, e.g., velocity and temperature profiles beginning with flow through a pipe inlet, to developing flow, and to developed flow therealong. Because of nonlinear relationships among geometry and operating conditions for a given heat exchanger design, i.e., given selected values for width, length, depth, fin spacing, materials, etc., data obtained for one exchanger size cannot be used to size or rate accurately a heat exchanger of a different size. Therefore, the surface characteristics of a given heat exchanger design, e.g., rejection capacity, are primarily obtained experimentally for most exchanger surfaces because the flow phenomena are complex due to the geometric features of flow area and/or heat transfer surface.

The previous description of the disclosed embodiments is provided to enable any person skilled in the art to make or use the invention. Various modifications to these embodiments will be readily apparent to those skilled in the art, and the principles defined herein can be applied to other embodiments without departing from the spirit or scope of the invention. It is therefore desired that the present embodiments be considered in all respects as illustrative and not restrictive, reference being made to the appended claims as well as the foregoing descriptions to indicate the scope of the invention.

What is claimed is:

1. A heat exchanger for a vehicle, the heat exchanger comprising:
    a plurality of chambers, each chamber formed from an upper sheet and a lower sheet, each chamber comprising a plurality of indentations characterized by localized regions where said upper and lower sheet are coupled such that fluid flow within each localized region is inhibited, said upper sheet having an inlet and an outlet, said lower sheet forming a body panel of said vehicle, wherein in an assembled configuration, said upper sheet forms an inner heat exchange surface,
    said vehicle including an internal vehicle passage that includes an air inlet disposed within an ambient airflow separation region and proximate a front end of said vehicle, an air outlet disposed proximate a trailing end of said vehicle, and an interstitial cavity disposed therebetween, said inner heat exchange surface in fluid communication with said interstitial cavity so that said internal vehicle passage is adapted to exchange heat with an ambient environment,
    and wherein said upper sheet forms an outer heat exchange surface adapted to exchange heat with said ambient environment.

2. The heat exchanger of claim 1, wherein said at least one chamber further comprises a fluid channel, and a channel divider, said chamber adapted to receive a fluid at said inlet, to expel said fluid at said outlet, said inlet and said outlet disposed proximate a first end, said fluid passing along said fluid channel, said channel divider extending from said first end to proximate a second end, said channel divider adapted to cause the fluid to exchange heat with the entirety of said inner and outer chamber portions, said fluid then passing through to said outlet, and wherein said at least one indentation is disposed along said fluid channel configured to promote turbulence of said fluid in said chamber.

3. The heat exchanger of claim 2 further comprising a heat exchange loop coupled to said inlet and said outlet of said heat exchanger, said heat exchange loop including a heat pump being mechanically and thermally coupled to one or more demand systems and adapted to transfer heat to or from said heat exchanger to thereby be transferred from or to said internal environment within said vehicle and/or said ambient environment.

4. The heat exchanger of claim 3, wherein said two or more chambers are coupled to said heat exchange loop in a parallel configuration.

5. The heat exchanger of claim 4, wherein at least two of said chambers are thermally decoupled.

6. An aerodynamic vehicle comprising:
    a body including upper and lower body portions extending from a front end to a trailing end, an internal vehicle passage including an air inlet disposed within an ambient airflow separation region and proximate said front end, an air outlet disposed proximate said trailing end, and an interstitial cavity disposed therebetween, said air inlet and said air outlet disposed on said body; and
    an aerodynamic heat exchanger disposed on said lower body portion, said aerodynamic heat exchanger comprising:
        a plurality of chambers formed from an upper sheet and a lower sheet, each chamber formed from an upper sheet and a lower sheet, each chamber comprising a plurality of indentations characterized by localized regions where said upper and lower sheet are coupled such that fluid flow within each localized region is inhibited, said upper sheet having an inlet, an outlet, and an inner heat exchange surface in fluid communication with said interstitial cavity said lower sheet forming a body panel of said body,
    wherein in an assembled configuration, said inner heat exchange surface is adapted to exchange heat with said internal vehicle passage, said internal vehicle passage adapted to exchange heat with an ambient environment;
    and wherein said upper sheet forms an outer heat exchange surface adapted to exchange heat passively with said ambient environment.

7. The aerodynamic vehicle of claim 6, wherein said air outlet is formed along one or more portions of said body where flow separation already occurs, irrespective of flow caused by said air outlet.

8. The aerodynamic vehicle of claim 7, wherein said air inlet is formed at the intersection of a cowl and a windshield, the cowl disposed proximate said front end, and wherein said air outlet is formed proximate said trailing end.

9. The aerodynamic vehicle of claim 6, wherein said at least one chamber further comprises a fluid channel, and a channel divider, said chamber adapted to receive a fluid at said inlet, to expel said fluid at said outlet, said inlet and said outlet disposed proximate a first end, said fluid passing along said fluid channel, said channel divider extending from said first end to proximate a second end, said channel divider adapted to cause the fluid to exchange heat with the entirety of said inner and outer chamber portions, said fluid then passing through to said outlet, and wherein said at least one indentation is disposed along said fluid channel configured to promote turbulence of said fluid in said chamber.

10. The aerodynamic vehicle of claim 9 further comprising a heat exchange loop coupled to said inlet and said outlet of said aerodynamic heat exchanger, said heat exchange loop including a heat pump being mechanically and thermally coupled to one or more demand systems and adapted to transfer heat to or from said heat exchanger to thereby be transferred from or to said internal environment within said vehicle and/or said ambient environment.

11. The aerodynamic vehicle of claim 10 further comprising one or more fans adapted for moving air from said air inlet to said air outlet.

12. The aerodynamic vehicle of claim 11 further comprising an additional heat exchanger disposed within said internal vehicle passage, said additional heat exchanger being coupled to said heat exchange loop and adapted to provide additional heat exchange capacity in addition to the heat exchange capacity of said inner heat exchange surface.

13. The aerodynamic vehicle of claim 6 further comprising a battery, said internal heat exchange surface being thermally separated from said battery so that said internal vehicle passage extends therebetween.

14. The aerodynamic vehicle of claim 6, wherein said aerodynamic heat exchanger extends from proximate said front end to proximate said trailing end.

15. A method of transferring heat to or from one or more demand systems of a vehicle, the method comprising the steps of:
- providing a body including:
  - upper and lower body portions extending from a front end to a trailing end;
  - an internal vehicle passage including an air inlet disposed within an ambient airflow separation region and proximate said front end, an air outlet disposed proximate said trailing end, and an interstitial cavity disposed therebetween, said air inlet and said air outlet disposed on said body, and
  - an aerodynamic heat exchanger including two or more chambers formed from an upper sheet and a lower sheet, each chamber having:
    - a plurality of indentations characterized by localized regions where said upper and lower sheet are coupled such that fluid flow within each localized region is inhibited,
    - said upper sheet having an inlet and an outlet disposed proximate a first end, said upper sheet further having an inner heat exchange surface adapted to exchange heat with said interstitial cavity which is adapted to exchange heat with an ambient environment,
    - said lower sheet forming an aerodynamic body panel of said vehicle, said lower sheet having an outer heat exchange surface adapted to exchange heat with said ambient environment;
- moving air from said ambient environment to said air inlet;
- moving air from said air inlet, through said interstitial cavity, to proximate said inner heat exchange surface, to thereby exchange heat with said aerodynamic heat exchanger and air;
- moving air from proximate said interstitial cavity, through said vehicle passage, to said air outlet; and
- moving air from said air outlet to said ambient environment.

16. The method of claim 15, where said air outlet is formed along one or more portions of said body where flow separation occurs.

17. The method of claim 16, wherein said air inlet is formed at the intersection of a cowl and a windshield, the cowl disposed proximate said front end, and wherein said air outlet is formed proximate said trailing end.

18. The method of claim 15, further comprising moving air over said outer heat exchange surface, to thereby exchange heat with said aerodynamic heat exchanger and air.

* * * * *